United States Patent
Doktor et al.

(10) Patent No.: US 12,524,320 B2
(45) Date of Patent: Jan. 13, 2026

(54) VERIFICATION OF SECURITY EQUIPMENT SYSTEMS INTEROPERABILITY

(71) Applicant: MOTOROLA SOLUTIONS, INC., Chicago, IL (US)

(72) Inventors: Piotr G. Doktor, Wieliczka (PL); Piotr Chorzepa, Cracow (PL); Mariusz R. Wawrowski, Wawrzenczyce (PL); Marcin Lechowicz, Cracow (PL); Jakub Siedlik, Tarnow (PL); Szymon Sikora, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 14 days.

(21) Appl. No.: 18/736,790

(22) Filed: Jun. 7, 2024

(65) Prior Publication Data
US 2025/0377995 A1 Dec. 11, 2025

(51) Int. Cl.
G06F 11/22 (2006.01)
G06F 11/30 (2006.01)

(52) U.S. Cl.
CPC ...... G06F 11/2289 (2013.01); G06F 11/3089 (2013.01)

(58) Field of Classification Search
CPC ............. G06F 11/2289; G06F 11/3089; G06F 2201/80
See application file for complete search history.

(56) References Cited

U.S. PATENT DOCUMENTS

| 8,745,589 | B2 | 6/2014 | Arumugham et al. |
| 10,073,763 | B1 | 9/2018 | Raman et al. |
| 10,831,633 | B2 | 11/2020 | Hasija et al. |
| 10,979,325 | B2 * | 4/2021 | Azizullah ............... H04L 43/18 |
| 11,307,967 | B2 | 4/2022 | Zhang et al. |
| 11,449,415 | B2 | 9/2022 | Anand et al. |
| 2013/0007523 | A1 | 1/2013 | Unger et al. |
| 2020/0327481 | A1 | 10/2020 | Allouche |

FOREIGN PATENT DOCUMENTS

| CN | 114880972 A | 8/2022 |
| CN | 115543765 A | 12/2022 |

* cited by examiner

Primary Examiner — Joseph R Kudirka
(74) Attorney, Agent, or Firm — PERRY + CURRIER INC.

(57) ABSTRACT

A system of improving computer system operations by testing and verifying operation of changed computer subsystems is provided. The system determines that a change has occurred at one or more computer subsystems associated with a given workflow and then determines a given time to test the given workflow(s). A request to test the given workflow at the given time is sent by the workflow server to the computer subsystem(s). The workflow server receives acknowledgements from the computer subsystem(s) of the request to test the given workflow. The respective acknowledgements either accept or reject the given test time. Control signals are sent to the computer subsystems to automatically perform the test of the given workflow at the given time, if accepted, in a test mode. The system then verifies the change to the one or more computer subsystems by evaluating results of the test actions of the given workflow.

20 Claims, 17 Drawing Sheets

VERIFICATION OF SECURITY EQUIPMENT SYSTEMS INTEROPERABILITY

TECHNICAL FIELD

The present system relates to equipment for testing the operation of computer subsystems and for assessing computer subsystem performance during equipment upgrades, replacement and reconfigurations.

BACKGROUND OF THE INVENTION

Security ecosystems typically include radio communication systems, video communication systems and door access control systems, all working together with a central workflow server. The various physical components of such radio, video and door access control systems may be individually replaced or reconfigured over time. In addition, their dedicated software may also be individually upgraded one system at a time. This has the unfortunate potential to cause problems with operation of the overall security ecosystem. Put simply, changing one physical component (such as a radio transmitter, camera, or door locking system, or a computer system operating same) may introduce errors or unpredictable operation into the entire security ecosystem. Conflicts between a newly introduced or newly re-configured device, or software upgrades to such device, may cause systemwide interoperability issues. This is because changes in these computer subsystems can impact the existing workflows (which are typically sent from a central workflow server to the various computer subsystems such as radio, video and door locking computer subsystems).

In the case of security systems in particular, it is imperative that the system continues to function properly, reliably and with an absolute minimum of system interruption. Another concern important to security systems is that the entire system cannot be easily taken offline to make and verify changes to one or more of its physical or software components. Instead, the security ecosystem must typically remain operational as changes and upgrades are made to its various physical and software components.

To ensure smooth operation of the security ecosystem, the changes and upgrades made to the various physical and software components must be tested and verified. However, since the overall security ecosystem is typically operational at all times, such testing must be carried out while the system is up and running. Testing the operation of radio and video communication equipment at the same time that such radio and video communication equipment is being used for security enforcement can be problematic. Put simply, there are better and worse times to test each piece of computer subsystem equipment after such equipment has been upgraded, replaced or reconfigured. Unfortunately, determining these optimal test times can be challenging as well. This is because the best test time for testing a particular piece of equipment will depend both on what that piece of equipment is currently doing and what other pieces of equipment or computer subsystems in the security ecosystem are currently doing. For example, testing new or newly-configured equipment operation at a computer subsystem during an emergency situation would not be desired.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
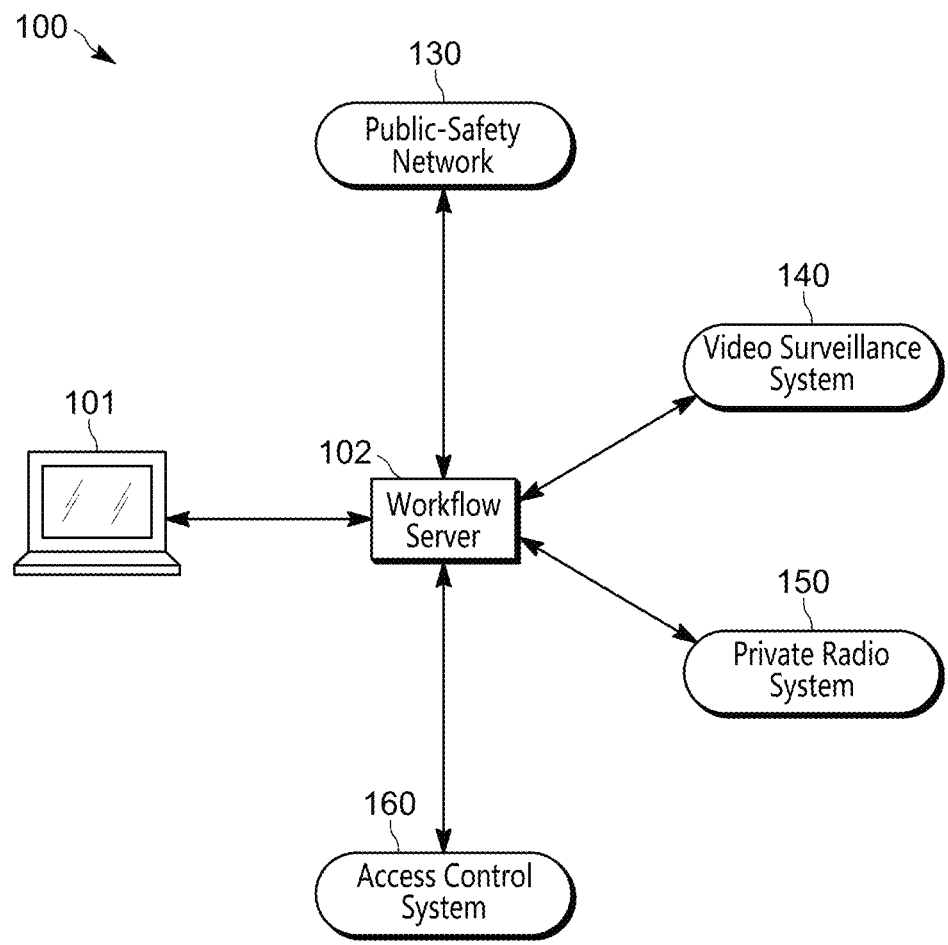
FIG. 1 depicts a security ecosystem capable of configuring and automating workflows, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In order to address the above-mentioned need, a system, method, and apparatus for improving computer system operations by testing and verifying operation of changed computer subsystems is provided herein.

For example, a system is provided herein for testing and verifying operation of changed computer subsystem equipment that allows for newly changed components to be tested during normal operation of the overall security ecosystem. The system may determine the optimal times for such testing of these subsystems to be performed, while also taking into account the activity at the newly changed computer subsystem and the activity taking place in other computer subsystems in the overall security ecosystem. The provided system may further adapt to changing conditions occurring in real time (for example, not testing, but postponing testing, during an actual emergency).

For example, a workflow may be based on both assessing and verifying the operation of the newly changed physical and software components of the computer subsystems (e.g.,: radio, video and locking computer subsystems), and determining whether further improvements or updates are required before any part or component of the security ecosystem fails. Hence, a technical problem is addressed by verifying the healthy state of the various computer subsystems (e.g.,: radios, cameras, locks) such that they all work together in a manner that reduces the impact on regularly scheduled workflows.

In particular examples, during operation, a computing device, such as a workflow server, may monitor one or more triggers that occur in the differing systems and devices based on sensor data generated by, and received from one or more sensors, and, in response, implement one or more actions that may include communicating with one or more communication devices across the differing systems and devices, for example to dispatch security personnel associated with the one or more communication devices to locations at which the sensor data was collected that lead to the triggers. Such communication will also preferably comprise alerting such personnel as to when testing and verification is being carried out (for example, labelling workflow actions as being conducted in "test mode".

Hence, also provided herein is a computing device, for example in the form of a workflow server interacting with a workstation, which tests and verifies the operation of computer subsystem (including both the physical components of such systems including radios, cameras and locking systems, and the software running thereon) that have been changed, for example, by being replaced, reconfigured or having their software updated. The present computer device also monitors execution of a safety workflow and/or a plurality of safety workflows. A safety workflow is understood to include an association between a trigger, which occurs when certain conditions are met as determined using sensor data from a physical sensor, and an action, which occurs in response to the trigger and which may include at least an electronic interaction and/or communication with a communication device. One example trigger may comprise determining that a given door is open (e.g., and/or has been open for a given time period) and a responsive action may comprise communicating with a given communication device to dispatch security personnel operating the communication device to the location of the open door.

The computing device further provides, at a display screen (e.g., of the workstation), an indication of a safety work flow and respective visual indications of a physical sensor that generated sensor data of a trigger of the safety workflow and a communication device associated with a responsive action to the trigger. An input device may be used to detect an interaction with one or more of the respective visual indications to one or more of retrieve the sensor data, communicate with the communication device, and send the sensor data to the communication device.

However, it may be challenging to communicate with the one or more communication devices and/or to confirm that such one or more communication devices have received messages; indeed, in some instances, control of a safety workflow may depend on whether or not such communication devices have received messages. Thus, there exists a need for an improved technical system, device, and system for improving computer system operations by testing and verifying operation of changed computer subsystems.

In particular, communication devices to which messages may be transmitted may communicate via talkgroups. However, some types of networks (e.g., digital communication networks) may support talkgroup affiliation while other types of networks may not support talkgroup affiliation. For networks that do no support talkgroup affiliation, determining whether or not a communication device has received a message (e.g., such as a text message) may be challenging as such networks may not generally support polling for acknowledgements of receipt of messages. As communication devices may join talkgroups (e.g., tune into particular radio channels) regardless of a network on which the communication devices are communicating, it can hence be difficult to determine whether a message transmitted to a talkgroup has been received or not.

Hence, provided herein is a security ecosystem, device and method for improving computer system operations by testing and verifying operation of changed computer subsystems.

Over time, various subsystems and physical components of the security ecosystem will change. Such changes will occur when individual system components are replaced, reconfigured or have their software updated. Operation of the newly changed components and subsystems needs to be tested and verified since changes in one component or subsystem may affect operation in other components and subsystems. It is also important that the entire security ecosystem not be shut down simply to test and verify these newly changed individual components and subsystems. Thus, testing and verification needs to be carried out during normal system operation.

Accordingly, the present system provides a security ecosystem, device and method for testing and verifying operation of these changed computer subsystems. One aspect of the present specification provides a method of improving computer system operations by testing and verifying operation of changed computer subsystems, comprising: determining, via a workflow server, that a change has occurred at one or more computer subsystems associated with a given workflow implemented by the workflow server, wherein the given workflow comprises one or more triggers and one or more responsive actions; determining, via the workflow server, a given time to test the given workflow on the one or more computer subsystems based on one or more of: historical computer subsystem data, and current computer subsystem status; providing, via the workflow server, the one or more computer subsystems with a request to test the given workflow at the given time; receiving, via the workflow server, respective acknowledgements from the one or more computer subsystems of the request to test the given workflow, the respective acknowledgements either accepting or rejecting the given time to test the given workflow; when the given time is accepted, sending, via the workflow server, to the one or more computer subsystems, one or more respective control signals to control the one or more computer subsystems to automatically perform a test of the given workflow at the given time, in a test mode such that one or more of the triggers are activated to perform one or more of the responsive actions as test actions; and verifying, via the workflow server, the change to the one or more computer subsystems by: evaluating results of the test actions of the given workflow, wherein the test actions are performed with a physical sensor in the computer subsystem generating sensor data of the test action and a communication device in the computer subsystem sending the sensor data to the workflow server.

Optionally, the present system further comprises synchronizing a database in the workflow server with a respective database in the one or more computer subsystems based on the evaluating of the results of the test. The computer subsystem(s) accept or reject the given time to test the given workflow based on one or more of: respective historical subsystem data; and respective current subsystem status. Optionally, if the workflow has been triggered in normal operation mode, and successfully completes before the time window has been accepted by the computer subsystem(s), the system databases can be synchronized to indicate that further testing of the workflow is not required.

In further optional embodiments, the one or more computer subsystems accept or reject the given time to test the given workflow is based on meeting respective threshold conditions for the triggers of the test actions corresponding to one or more of: respective historical subsystem data; and respective current subsystem status. The acceptance or rejection of the proposed time to test the workflow can include rejecting the proposed given test time when the given workflow is running or about to run or when the computer subsystem resources are not available at that time.

When the proposed test time is rejected, the computer subsystem(s) can propose an alternate test time based on historical subsystem data and current subsystem status, or on meeting threshold conditions based on historical subsystem data and current subsystem status. In addition, if a given test time is rejected by the computer subsystem(s), the workflow server may update its own historical data for the particular subsystem such that this data can be taken into account in future when the workflow server next proposes a given test time.

The present specification provides a method of improving computer system operations by testing and verifying operation of changed computer subsystems, comprising:
determining, via a workflow server, that a change has occurred at one or more computer subsystems associated with a given workflow implemented by the workflow server, wherein the given workflow comprises one or more triggers and one or more responsive actions;
determining, via the workflow server, a given time to test the given workflow on the one or more computer subsystems based on one or more of: historical computer subsystem data, and current computer subsystem status;
providing, via the workflow server, the one or more computer subsystems with a request to test the given workflow at the given time;
receiving, via the workflow server, respective acknowledgements from the one or more computer subsystems of the request to test the given workflow, the respective acknowledgements either accepting or rejecting the given time to test the given workflow;
when the given time is accepted, sending, via the workflow server, to the one or more computer subsystems, one or more respective control signals to control the one or more computer subsystems to automatically perform a test of the given workflow at the given time, in a test mode such that one or more of the triggers are activated to perform one or more of the responsive actions as test actions; and
verifying, via the workflow server, the change to the one or more computer subsystems by: evaluating results of the test actions of the given workflow, wherein the test actions are performed with a physical sensor in the computer subsystem generating sensor data of the test action and a communication device in the computer subsystem sending the sensor data to the workflow server.

The present specification further provides a device comprising:
a controller; and
a computer-readable storage medium having stored thereon program instructions that, when executed by the controller, causes the controller to perform a set of operations comprising:
determining, via a workflow server, that a change has occurred at one or more computer subsystems associated with a given workflow implemented by the workflow server, wherein the given workflow comprises one or more triggers and one or more responsive actions;
determining, via the workflow server, a given time to test the given workflow on the one or more computer subsystems based on one or more of: historical computer subsystem data, and current computer subsystem status;
providing, via the workflow server, the one or more computer subsystems with a request to test the given workflow at the given time;
receiving, via the workflow server, respective acknowledgements from the one or more computer subsystems of the request to test the given workflow, the respective acknowledgements either accepting or rejecting the given time to test the given workflow;
when the given time is accepted, sending, via the workflow server, to the one or more computer subsystems, one or more respective control signals to control the one or more computer subsystems to automatically perform a test of the given workflow at the given time, in a test mode such that one or more of the triggers are activated to perform one or more of the responsive actions as test actions; and
verifying, via the workflow server, the change to the one or more computer subsystems by: evaluating results of the test actions of the given workflow, wherein the test actions are performed with a physical sensor in the computer subsystem generating sensor data of the test action and a communication device in the computer subsystem sending the sensor data to the workflow server.

Each of the above-mentioned aspects will be discussed in more detail below, starting with example system and device architectures of the system in which the embodiments may be practiced, followed by an illustration of processing blocks for achieving an improved security ecosystem, device and method for testing and verifying operation of changed computer subsystems.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus that may be on or off-premises, or may be accessed via cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions, which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the drawings.

Turning now to the drawings, wherein like numerals designate like components, FIG. 1 illustrates a security ecosystem 100 capable of configuring and automating workflows across multiple systems. The security ecosystem 100 is interchangeably referred to hereafter as the security ecosystem 100. Furthermore, workflows as referred to herein may alternatively be referred to as security workflows as workflows as referred to herein may be used to implement security-based action and/or security based processes.

The various components of the security ecosystem 100 are in communication via any suitable combination of wired and/or wireless communication links, and communication links between components of the security ecosystem 100 are depicted in FIG. 1, and throughout the present specification, as double-ended arrows between respective components; the communication links may include any suitable combination of wireless and/or wired links and/or wireless and/or wired communication networks, and the like.

As shown, the security ecosystem 100 comprises a public-safety network 130, a video surveillance system 140, a private radio system 150, and an access control system 160. A workflow server 102 is coupled to each of the network 130 and the systems 140, 150, and 160. The workstation 101 is shown coupled to the workflow server 102, and is utilized to configure the workflow server 102 with workflows, for example as generated by a user. It should be noted that although the components in FIG. 1 are shown geographically separated, these components can exist within a same geographic area, such as, but not limited to a school, a hospital, an airport, a sporting event, a stadium, a factory, a warehouse and/or any other suitable location and/or building and the like. It should also be noted that although only the network 130 and the systems 140, 150, and 160 are shown in FIG. 1, many more networks and/or systems may be included in the security ecosystem 100 and/or any suitable number of networks and/or systems may be included in the security ecosystem 100.

The workstation 101 may comprise a computer configured to execute Motorola Solution™'s Orchestrate™ and Ally™ dispatch and incident management software or any other suitable workflow management and/or incident management software. As will be discussed in more detail below, the workstation 101 is configured to present a user with a plurality of triggers capable of being detected by the network 130 and the systems 140, 150, and 160 as well as present the user with a plurality of actions capable of being executed by the network 130 and the systems 140, 150, and 160. The user will be able to generate workflows and upload these workflows to the workflow server 102 based on the presented triggers and actions. While only one workstation 101 is illustrated, the security ecosystem 100 may comprise a plurality of workstations 101.

The workflow server 102 may comprise a server running Motorola Solution™'s Command Central™ software suite comprising the Orchestrate™ platform. While the workflow server 102 is depicted as one device, the workflow server 102 may be implemented as one or more computing devices, one or more servers, one or more cloud computing devices, and the like, and/or the functionality of the workflow server 102 may be geographically distributed.

The workflow server 102 is configured to receive workflows generated by the workstation 101 (and/or a plurality of workstations 101) and implement the workflows. Furthermore, the workflow server 102 may implement (e.g., concurrently, and the like) different workflows associated with different workstations. Particularly, the workflows are implemented by analyzing events detected by the network 130 and the systems 140, 150, and 160 and executing appropriate triggers. In a particular example, a user may generate a workflow on the workstation 101 that has a trigger comprising the video surveillance system 140 detecting a loitering event, and has an action comprising notifying radios within the public-safety network 130. When this workflow is uploaded to the workflow server 102, the workflow server 102 will notify the radios of any loitering event detected by the video surveillance system 140.

The public-safety network 130 is configured to detect various triggers and report the detected triggers to the workflow server 102. The public-safety network 130 is also configured to receive action commands from the workflow server 102 and execute the actions. In some examples, the public-safety network 130 includes typical radio-access network (RAN) elements such as base stations, base station controllers (BSCs), routers, switches, and the like, arranged, connected, and programmed to provide wireless service to user equipment, report detected events, and execute actions received from the workflow server 102.

The video surveillance system 140 is configured to detect various triggers and report the detected triggers to the workflow server 102. The video surveillance system 140 is also configured to receive action commands from the workflow server 102 and execute the actions. In one example, the video surveillance system 140 comprises a plurality of video cameras that may be configured to automatically change their field-of-views over time. The video surveillance system 140 is configured with a recognition engine/video analysis engine (VAE) that comprises a software engine that analyzes any video captured by the cameras using, for example, any suitable process which may include, but is not limited to machine learning algorithms, convolutional neural networks (CNNs), and the like. Using the VAE, the video surveillance system 140 is capable of "watching" video to detect any triggers and report the detected triggers to the workflow server 102. These triggers may include, but are not limited to, appearance searches and unusual Activity Detection (e.g., loitering). In a similar manner, the video surveillance system 140 is configured to execute action commands received from the workflow server 102. In some examples, the video surveillance system 140 comprises an Avigilon™ Control Center (ACC) server having Motorola Solution™'s Access Control Management (ACM)™ software suite.

The private radio system 150 may comprise a private enterprise radio system that is configured to detect various triggers and report the detected triggers to the workflow server 102. The private radio system 150 is also configured to receive action commands from the workflow server 102 and execute the actions. In some examples, the private radio system 150 comprises a MOTOTRBO™ communication system having radio devices that operate in the Citizens Broadband Radio Service (CBRS) spectrum and combines broadband data with voice communications.

The access control system 160 comprises an Internet-of-Things (IoT) network which may serve to connect every-day devices to the Internet. Devices such as cars, kitchen appliances, medical devices, sensors, doors, windows, HVAC (heating, ventilation, and air conditioning) systems, drones, etc. can all be connected through the IoT network of the access control system 160. Indeed, any suitable device that can be powered may be connected to the internet to control its functionality. The access control system 160 generally allows objects to be sensed or controlled remotely across existing network infrastructure. For example, the access control system 160 may be configured to provide access control to various doors and windows. In particular, the access control system 160 is configured to detect various triggers (e.g., door opened/closed) and report the detected triggers to the workflow server 102. The access control system 160 is also configured to receive action commands from the workflow server 102 and execute the action received from the workflow server 102. The action commands may take the form of instructions to lock, open, and/or close a door or window.

As is evident, the security ecosystem 100 allows an administrator using the workstation 101 to generate rule-based, automated workflows between technologies to enhance efficiency, and improve response times, effectiveness, and overall safety. The security ecosystem 100 generally has the capability to detect triggers across a number of devices within the network 130 and the systems 140, 150, and 160 and quickly take actions by automatically executing the proper procedure (i.e., executing the appropriate action once a trigger is detected).

The network 130 and the systems 140, 150, and 160 are next described in further detail.

Figure 2:
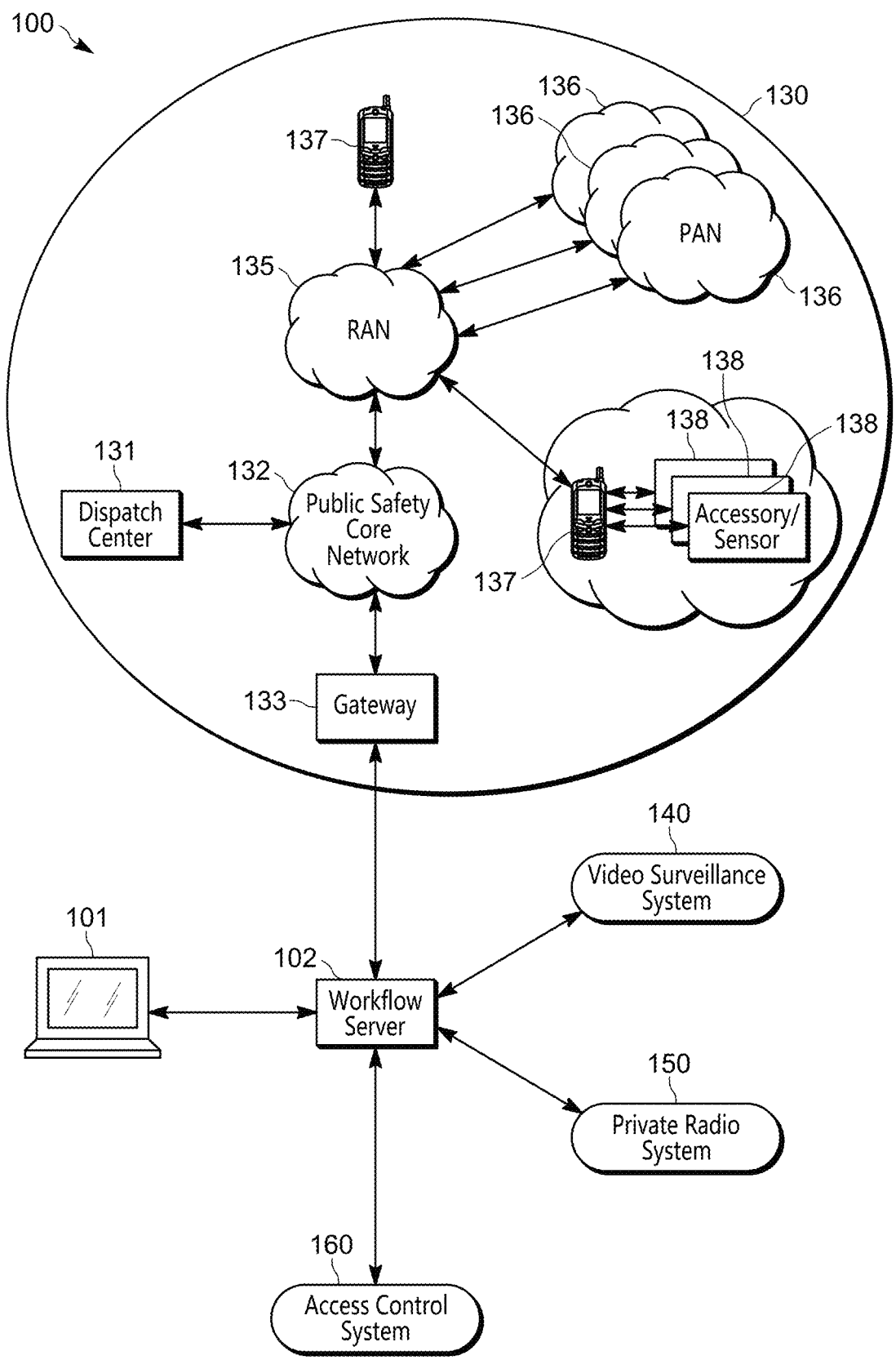
FIG. 2 depicts a security ecosystem capable of configuring and automating workflows, in accordance with some examples.

FIG. 2 illustrates a security ecosystem capable of configuring and automating workflows. In particular, FIG. 2 shows the security ecosystem 100 with an expanded view of the public-safety network 130. As shown, the public-safety network 130 comprises a dispatch center 131, a public-safety core network 132, a gateway 133, a radio access network (RAN) 135, a plurality of personal-area networks (PANs) 136, and at least one radio 137, such as a public-safety radio and the like (however the radios 137 may include, but are not limited to, any suitable combination of communication devices, such as mobile phones, two-way radios, and the like). As shown, each PAN 136 comprises a radio 137 acting as a hub to smart devices/accessories/sensor 138 (interchangeably referred to hereafter as the sensors and/or a sensor 138).

The gateway 133 may comprise an Avigilon™ Control Center running Avigilon's Access Control Management software (e.g., when the public-safety network 130 includes video cameras and/or the radios 137). The gateway 133 is configured to run any suitable Application Program Interface (API) to provide communications between the public-safety core network 132 and the workflow server 102.

A public safety officer (not shown in FIG. 2) may be equipped with sensors 138 that determine various physical and environmental conditions surrounding the public-safety officer. These conditions may be reported back to, for example, the dispatch center 131 or the workflow server 102 so an appropriate action may be taken. For example, police officers may have a sensor 138 (e.g., in the form of a gun-draw sensor) that determines when a gun is drawn. Upon detecting that an officer has drawn their gun, a notification may be sent back to the dispatch operator and/or the workflow server 102 so that, for example, other officers in the area may be notified of the situation.

It is envisioned that the public-safety officer may have an array of these sensors 138 available to the officer at the beginning of a shift. The officer may select and pull sensors 138 off a shelf, and form a personal-area network (PAN) 136 with the devices that may accompany the officer on their shift. For example, the officer may pull a gun-draw sensor, a body-worn camera, a wireless microphone, a smart watch, a police radio, smart handcuffs, a man-down sensor, a bio-sensor, and the like. All sensors 138 pulled by the officer may be configured to form a PAN 136 by associating (pairing) with each other and communicating wirelessly among the devices. At least one device may be configured with a digital assistant. In some examples, a PAN 136 comprises more than two sensors 138, so that many sensors 138 may be connected via a PAN 136 simultaneously.

A method called bonding may be used for recognizing specific sensors 138 and thus enabling control over which accessories are allowed to connect to each other when forming a PAN 136. Once bonded, accessories then can establish a connection without user intervention. A bond may be generated through a process called "pairing". The pairing process may be triggered by a specific request by the user to generate a bond from a user via a user interface on the accessories. Thus, as shown, public-safety network 130 incorporates PANs 136 generated as described above. In some examples, radios 137 and sensors 138 form a PAN 136, with communication links between sensors 138 and radios 137 taking place utilizing a short-range communication system protocol such as a Bluetooth communication system protocol. In this particular example, a PAN 136 may be associated with a single officer. Thus, FIG. 2 illustrates multiple PANs 136 associated with multiple officers (not shown).

The RAN 135 may include various RAN elements such as base stations, base station controllers (BSCs), routers, switches, and the like, arranged, connected, and programmed to provide wireless service to user equipment (e.g., the radios 137, and the like) in a manner known to those of skill in the relevant art. The RAN 135 may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other examples, the RAN 135 may implement a Long Term Evolution (LTE), LTE-Advance, or 5G protocol including multimedia broadcast multicast services (MBMS) or single site point-to-multipoint (SC-PTM) (including, but not limited to open mobile alliance (OMA) push to talk (PTT) over cellular (OMA-PoC)), a voice over IP (VOIP), an LTE Direct or LTE Device to Device, or a PTT over IP (PoIP). In still further examples, the RAN 135 may implement a Wi-Fi protocol for example operating in accordance with an IEEE 802.11 standard (e.g., 802.11a, 802.11b, 802.11g) or a WiMAX protocol for example operating in accordance with an IEEE 802.16 standard.

The public-safety core network 132 may include one or more packet-switched networks and/or one or more circuit-switched networks, and in general provides one or more public-safety agencies with any suitable computing and communication needs, transmitting any suitable public-safety-related data and communications.

For narrowband LMR wireless systems, the public-safety core network 132 may operate in either a conventional or trunked configuration. In either configuration, a plurality of communication devices is partitioned into separate groups (talkgroups) of communication devices. In a conventional narrowband system, each communication device in a group is selected to a particular radio channel (frequency or frequency & time slot) for communications associated with that communication device's group. Thus, each group is served by one channel, and multiple groups may share the same single frequency (in which case, in some examples, group IDs (identifiers) may be present in the group data to distinguish between groups using the same shared frequency).

In contrast, a trunked radio system and its communication devices use a pool of traffic channels for virtually an unlimited number of groups of communication devices (e.g., talkgroups). Thus, all groups are served by all channels. The trunked radio system works to take advantage of the probability that not all groups need a traffic channel for communication at the same time.

Group calls may be made between radios 137 and other devices via wireless transmissions in accordance with either a narrowband or a broadband protocol or standard. Group members for group calls may be statically or dynamically defined. That is, in a first example, a user or administrator may indicate to the switching and/or radio network (such as at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., communication devices) could be provisioned in the network by the user or an agent, and then provided some form of group identity or identifier, for example. Then, at a future time, an originating user in a group may cause some signaling to be transmitted indicating that he or she wishes to establish a communication session (e.g., join a group call having a particular talkgroup ID) with each of the pre-designated participants in the defined group. In another example, communication devices may dynamically affiliate with a group (and also disassociate with the group) based on user input, and the switching and/or radio network may track group membership and route new group calls according to the current group membership.

The radios 137 generally serve as PAN main devices, and may be any suitable computing and communication device configured to engage in wireless communication with the RAN 135 over the air interface as is known to those in the relevant art. Moreover, one or more radios 137 are further configured to engage in wired and/or wireless communication with one or more local sensor 138 via a local communication link. The radios 137 may be configured to determine when to forward information received from sensors 138 to, for example, a dispatch center or the workflow server 102.

Some examples of sensors 138 follow:

In some examples, a sensor 138 may comprise a sensor-enabled holster that maintains and/or provides state information regarding a weapon or other item normally disposed within the user's sensor-enabled holster. The sensor-enabled holster may detect a change in state (presence to absence) and/or an action (removal) relative to the weapon normally disposed within the sensor-enabled holster. The detected change in state and/or action may be reported to a radio 137 via its short-range transceiver, which may forward the state change to the dispatch center 131 or the workflow server 102. In some examples, the sensor-enabled holster may also detect whether the first responder's hand is resting on the weapon even if it has not yet been removed from the holster and provide such information to portable radio 137.

In some examples, a sensor 138 may comprise a biometric sensor (e.g., a biometric wristband) for tracking an activity of the user or a health status of a user, and may include one or more movement sensors (such as an accelerometer, magnetometer, and/or gyroscope) that may periodically or intermittently provide to a radio 137 indications of orientation, direction, steps, acceleration, and/or speed, and indications of health such as one or more of a captured heart rate, a captured breathing rate, and a captured body temperature of the user, for example accompanying other information. This information may be reported to a radio 137 which may forward the information to the dispatch center 131 and/or the workflow server 102.

In some examples, a sensor 138 may comprise an accelerometer to measure acceleration. Single and multi-axis models are available to detect magnitude and direction of the acceleration as a vector quantity, and may be used to sense orientation, acceleration, vibration shock, and falling. The accelerometer may determine if an officer is running. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and may be used to determine a direction in which a person or device is facing. This information may be reported to a radio 137 which may forward the information to dispatch center 131 and/or the workflow server 102.

In some examples, a sensor 138 may comprise a heart rate sensor that uses electrical contacts with the skin to monitor an electrocardiogramaignal of its wearer, or may use infrared light and imaging device to optically detect a pulse rate of its wearer, among other possibilities. This information may be reported to a radio 137 which may forward the information to the dispatch center 131 and/or the workflow server 102.

In some examples, a sensor 138 may comprise a breathing rate sensor 138 to monitor breathing rate. The breathing rate sensor may include use of a differential capacitive circuits or capacitive transducers to measure chest displacement and thus breathing rates. In other examples, a breathing sensor may monitor a periodicity of mouth and/or nose-exhaled air (e.g., using a humidity sensor, temperature sensor, capnometer or spirometer) to detect a respiration rate. Other possibilities exist as well. This information may be reported to a radio 137 which may forward the information to the dispatch center 131 and/or the workflow server 102.

The dispatch center 131 may comprise, and/or may be part of, a computer-aided-dispatch center (sometimes referred to as an emergency-call center or public-safety answering point), that may be manned by an operator providing any suitable dispatch operations. For example, the dispatch center 131 may comprise a graphical user interface that provides the dispatch operator any suitable information about public-safety officers. As discussed above, some of this information originates from sensors 138 providing information to radios 137, which forwards the information to the RAN 135 and ultimately to the dispatch center 131.

In a similar manner, information about public-safety officers may be provided to the workflow server 102. This information may originate from the sensors 138 providing information to the radios 137, which forwards the information to the RAN 135 and ultimately to the workflow server 102 via the public-safety core network 132 and the gateway 133. For example, a sensor 138 comprising a gun-draw sensor may send an indication to the workflow server 102 that a gun has been drawn. This may serve as a "trigger" for the workflow server 102 to initiate a particular "action", for example, notifying surrounding officers (for example on a particular talkgroup) by having their radios 137 provide an alarm indicating the triggering event. Thus, the workflow server 102 may provide instructions to any sensor 138 or radio 137 by sending an "action" to a sensor 138 in response to a trigger being received.

Figure 3:
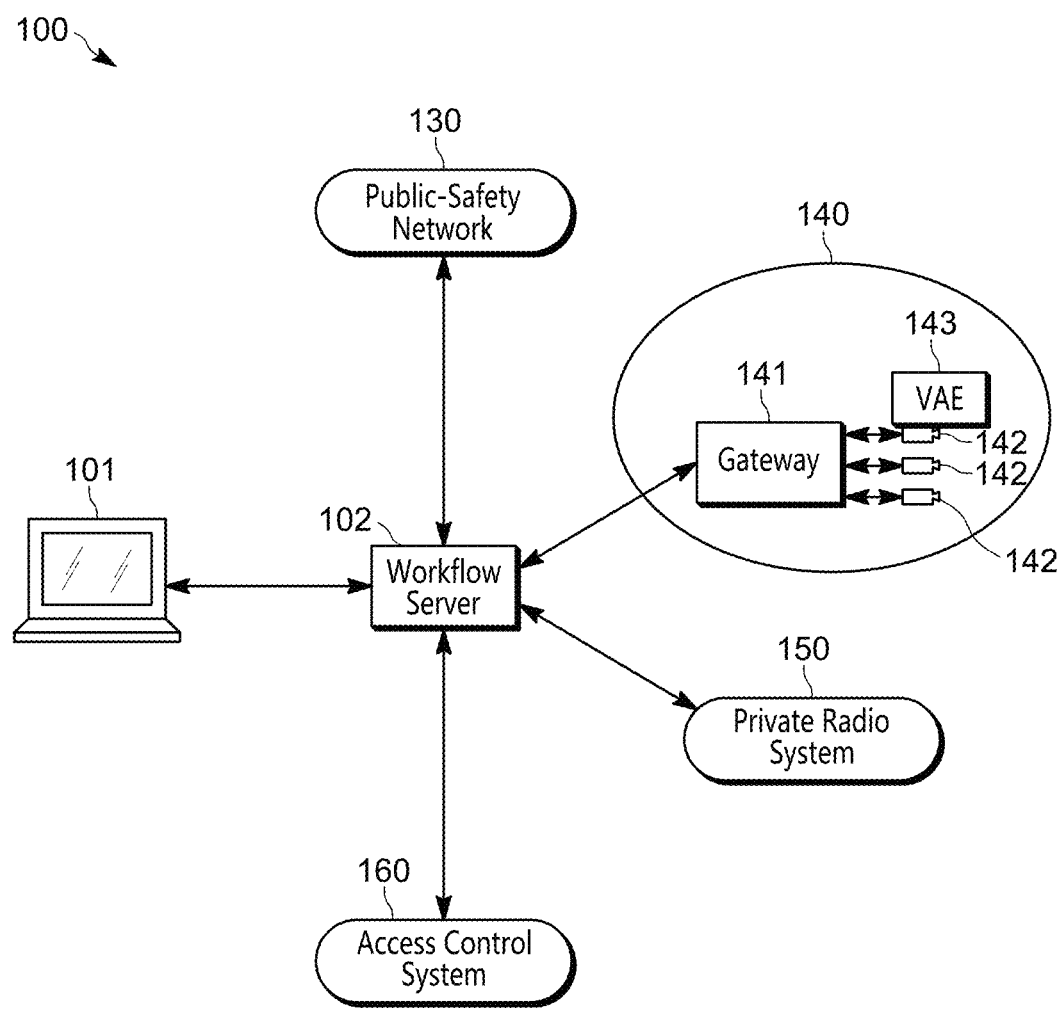
FIG. 3 depicts a security ecosystem capable of configuring and automating workflows, in accordance with some examples.

FIG. 3 illustrates a security ecosystem capable of configuring and automating workflows. In particular, FIG. 3 shows the security ecosystem 100 with an expanded view of the video surveillance system 140. As shown, the video surveillance system 140 comprises a plurality of image sensors and/or cameras 142 and a gateway 141.

Cameras 142 may be fixed or mobile, and may have pan/tilt/zoom (PTZ) capabilities to change their field-of-view. The cameras 142 are generally understood to comprise image sensors and hence may also be referred to as images sensors. Cameras 142 may also comprise circuitry configured to serve as a VAE 143 (only one of which is depicted in FIG. 3, though it is understood that any camera 142 may comprise circuitry configured to serve as a VAE 143). The VAE 143 comprises a software engine that analyzes analog and/or digital video. The VAE 143 is generally configured to "watch" video and detect pre-selected objects such as license plates, people, faces, automobiles. The VAE 143 may also be configured to detect certain actions of individuals, such as fighting, loitering, crimes being committed, etc. and/or actions of objects, such as speeding, a car driving on a pedestrian walkway, a car moving against the flow of traffic, etc.; however the VAE 143 may be configured to detect any suitable action. The VAE 143 may contain any of several object/action detectors. Each object/action detector "watches" the video for a particular type of object or action. Object and action detectors can be mixed and matched depending upon what is trying to be detected. For example, an automobile object detector may be utilized to detect automobiles, while a fire detector may be utilized to detect fires. Combinations of object detectors may be utilized to detect combinations of objects, such as automobiles on fire, and the like, automobiles that are not on fire, and the like.

The gateway 141 may comprise an Avigilon™ Control Center running Avigilon's Access Control Management software. The gateway 141 is configured to run any suitable Application Program Interface (API) to provide communications between any cameras 142 and the workflow server 102.

Figure 4:
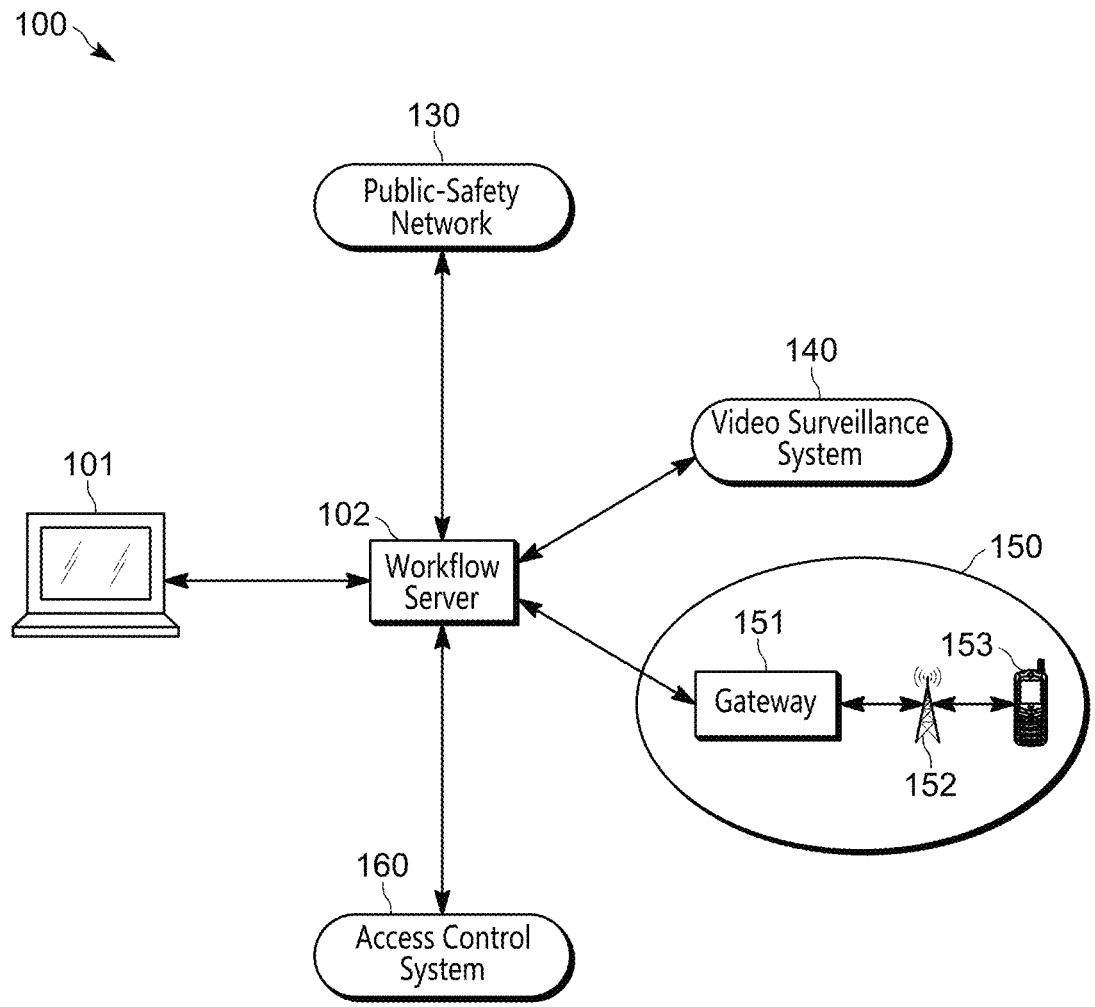
FIG. 4 depicts a security ecosystem capable of configuring and automating workflows, in accordance with some examples.

FIG. 4 illustrates a security ecosystem capable of configuring and automating workflows. In particular, FIG. 4 shows the security ecosystem 100 with an expanded view of the private radio system 150. As shown, the private radio system 150 comprises the gateway 151, system infrastructure 152, and at least one radio 153. Communications from the radio 153 to the workflow server 102 passes through the system infrastructure 152, the gateway 151, and ultimately to the workflow server 102.

The gateway 151 may comprise an Avigilon™ Control Center running Avigilon's Access Control Management software (e.g., when the private radio system 150 and/or the radios 153 include video cameras). The gateway 151 is configured to run any suitable Application Program Interface (API) to provide communications between any of the system infrastructure 152 and the workflow server 102.

The system infrastructure 152 comprises any suitable equipment to provide wireless communications to and from the radio 153. The system infrastructure 152 may comprise Motorola Solution™'s MOTOTRBO™ equipment, such as an SLR Series Repeater (e.g., SLR 1000, SLR 5000, or SLR8000 repeater) configured to provide two-way radio service to radio 153. However, the system infrastructure 152 may comprise one or more of a base station and/or base station controller and/or repeater.

Although only a single radio 153 is shown in FIG. 4, any suitable number of radios 153 may be present within the private radio system 150. Each radio 153 may comprise a MOTOTRBO™ two-way radio (such as a Motorola Solution™ XPR 5000 Series radio) with digital technology providing integrated voice and data communication.

Figure 5:
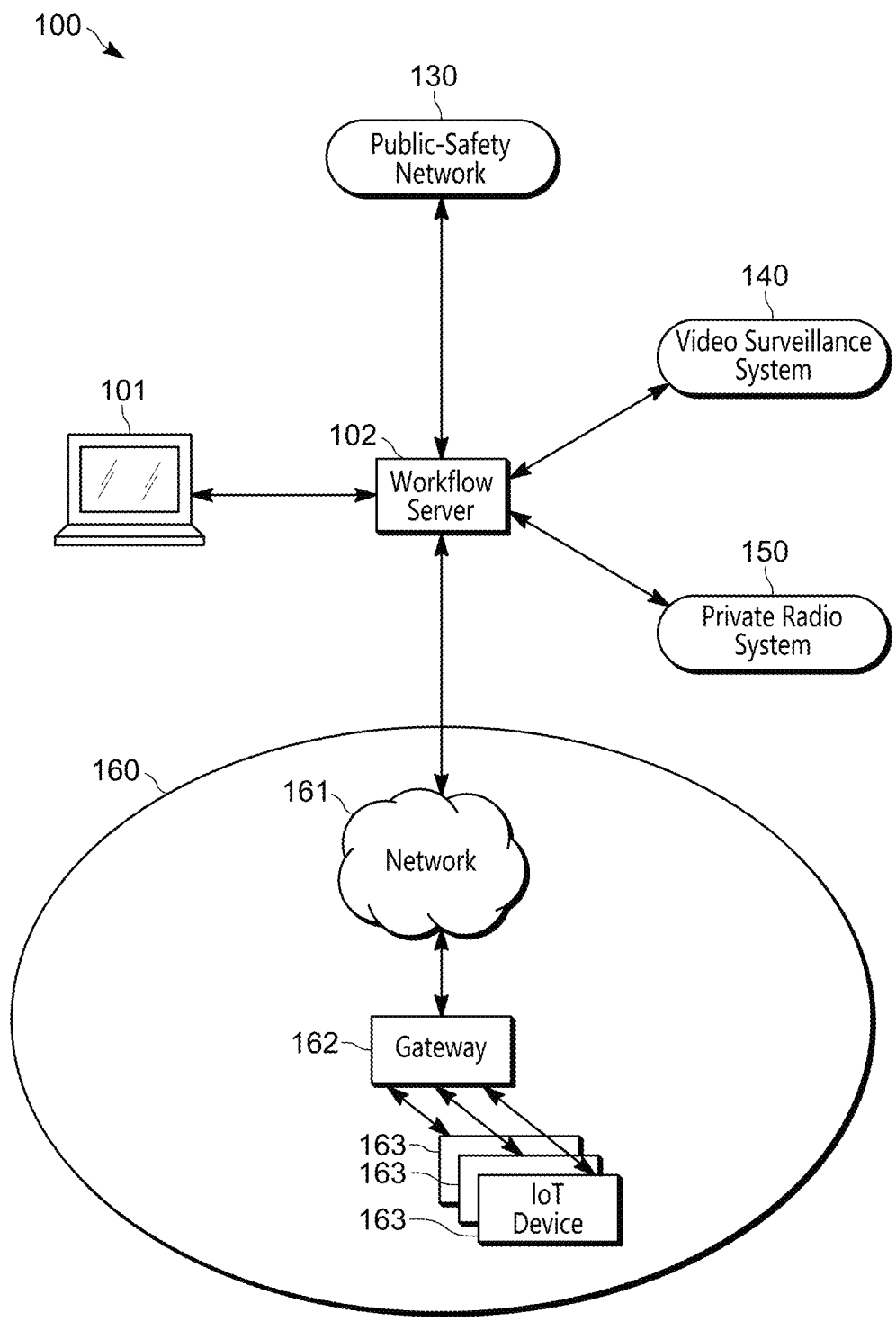
FIG. 5 depicts a security ecosystem capable of configuring and automating workflows, in accordance with some examples.

FIG. 5 illustrates a security ecosystem capable of configuring and automating workflows. In particular, FIG. 5 shows the security ecosystem 100 with an expanded view of the access control system 160. As shown, the access control system 160 comprises a gateway 162 and a plurality of IoT devices 163 coupled to the gateway 162. Data passed from the workflow server 102 to the IoT devices 163 passes through the network 161, the gateway 162 and ultimately to the IoT device 163. Conversely, data passed from the IoT devices 163 to the workflow server 102 passes through the gateway 162, the network 161, and ultimately to the workflow server 102.

The IoT devices 163 may comprise devices that control objects, doors, windows, sensors, and the like. Any particular suitable communication protocol (e.g., an IoT protocol) may be used for each IoT device. For example, various proprietary protocols such as DNP, Various IEC**** protocols (IEC 61850 etc. . . . ), bacnet, EtherCat, CANOpen, Modbus/Modbus TCP, EtherNet/IP, PROFIBUS, PROFINET, DeviceNet, etc. can be used. Also a more generic protocol such as Coap, Mqtt, and RESTfull may also be used.

The gateway 162 may comprise an Avigilon™ Control Center running Avigilon's Access Control Management software. The gateway 162 is configured to run any suitable Application Program Interface (API) to provide communications between any IoT device 163 and the workflow server 102.

The network 161 may comprise one of many networks used to transmit data, including, but not limited to, a network employing one of the following protocols: conventional, or trunked LMR standard or protocol such as ETSIDMR, a standard defined by the APCO, TETRA, or other LMR radio protocols or standards; LTE protocol, LTE-Advance protocol, or 5G protocol including multimedia broadcast MBMS or SC-PTM protocol (including, but not limited to an OMA-PTT OMA-PoC), a VoIP protocol, an LTE Direct or LTE Device to Device protocol, or a PoIP protocol, a Wi-Fi protocol for example operating in accordance with an IEEE 802.11 standard (e.g., 802.11a, 802.11b, 802.11g) or a WiMAX protocol for example operating in accordance with an IEEE 802.16 standard.

Figure 6:
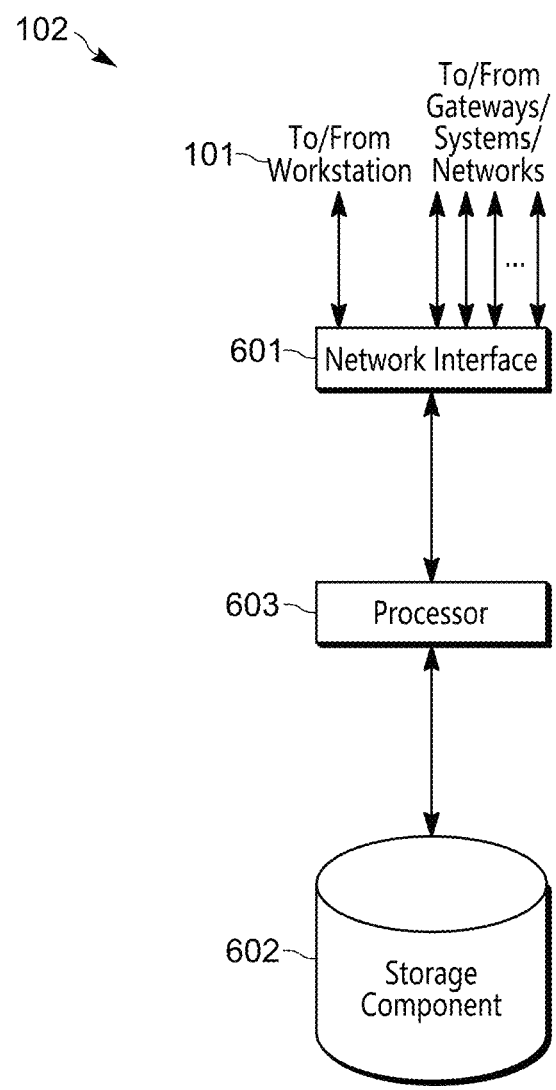
FIG. 6 is a block diagram of a workflow server of FIG. 1, in accordance with some examples.

FIG. 6 is a block diagram of the workflow server 102 of FIG. 1. As shown, the workflow server 102 comprises a network interface 601, a storage component 602 (e.g., as depicted a database, but may comprise any suitable memory and/or storage component having data 612 therein), and a processor 603. The processor 603 is understood to include any suitable logic circuitry.

The network interface 601 includes any suitable components for communicating with other suitable components of the security ecosystem 100, in particular, as depicted, to the workstation 101, the gateways 133, 141, 151, 162 of the network 130 and the systems 140, 150, and 160, and the like. Components of the network interface 601 include any suitable processing, modulating, and transceiver components that are operable in accordance with any one or more standard or proprietary wireless interfaces, wherein some of the functionality of the processing, modulating, and transceiver components may be performed by means of the processor 603 through programmed logic such as software applications or firmware stored on the storage component 602 (e.g., standard random access memory) or through hardware. The network interface 601 may include any suitable wired or wireless network interfaces, including, but not limited to, Ethernet interfaces, T1 interfaces, USB interfaces, IEEE 802.11b interfaces, IEEE 802.11g interfaces, and the like.

The processor 603 may comprise a digital signal processor (DSP), general purpose microprocessor, a programmable logic device, or application specific integrated circuit (ASIC), and the like, and is generally configured to receive triggers from various gateways, systems, and networks (e.g., of the security ecosystem 100). The processor 603 is further configured to execute (or cause to be executed) a particular action for a trigger that is received. More particularly, when the processor 603 receives a trigger from any network or system, the processor 603 may access the data 612 in storage component 602 to determine an action for the particular trigger. Once an action has been determined, the processor 603 will execute the action, or cause the action to be executed. In order to perform the above, the processor 603 may execute an instruction set/software (e.g., Motorola Solution™'s Command Central™ software suite comprising the Orchestrate™ platform) which may be stored at the storage component 602.

The storage component 602 may comprise standard memory (such as Random Access Memory (RAM), Read Only Memory (ROM), and the like) for storing data 612 and generally serves to store associations between triggers and actions. Examples of various triggers and actions are illustrated in in Table 1, below.

TABLE 1

Associations Between Triggers and Actions.

| Trigger | Action |
|---|---|
| Warehouse back door opened | Pan camera "342" to point at door |
| Man-Down sensor activated for Officer Smith | Notify dispatch center via emergency text message |
| ALPR for delivery truck | Open back gate |
| . . . etc. | . . . etc. |

Figure 7:
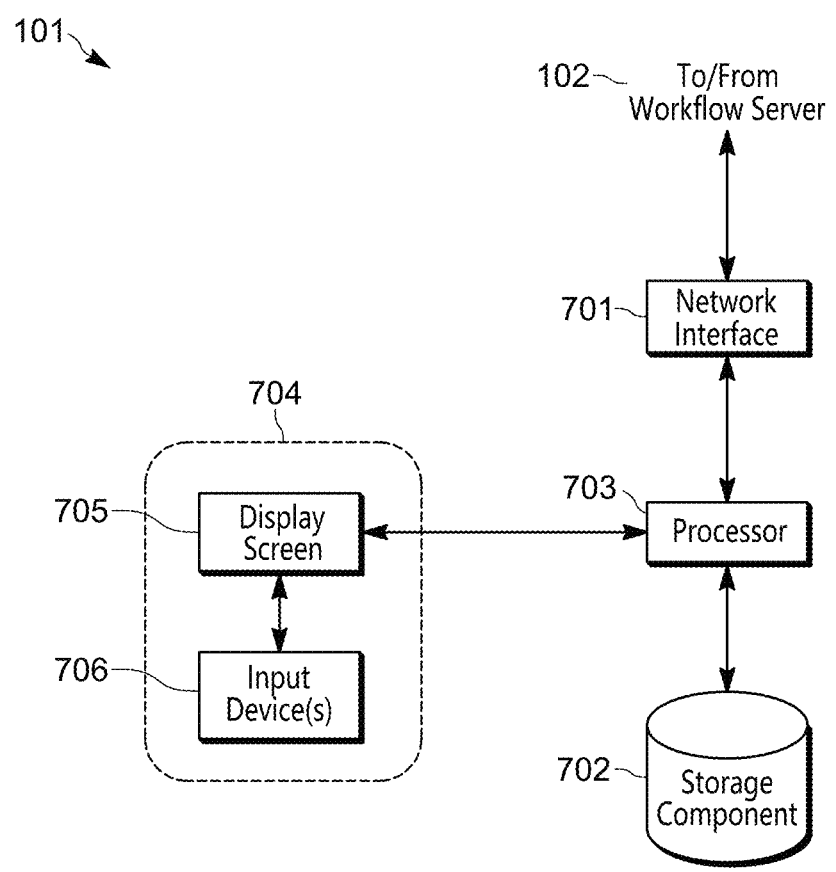
FIG. 7 is a block diagram of a workstation of FIG. 1 utilized to generate a workflow, in accordance with some examples.

FIG. 7 is a block diagram of the workstation 101 of FIG. 1 utilized to generate a workflow. As shown, the workstation 101 comprises a network interface 701, a storage component 702, a processor 703, and a graphical user interface (GUI) 704.

The network interface 701 includes any suitable components for communicating with other suitable components of the security ecosystem 100, in particular, as depicted, to the workflow server 102. Components of the network interface 701 include any suitable processing, modulating, and transceiver components that are operable in accordance with any one or more standard or proprietary wireless interfaces, wherein some of the functionality of the processing, modulating, and transceiver components may be performed by means of the processor 703 through programmed logic such as software applications or firmware stored on the storage component 702 (e.g., standard random access memory) or through hardware. The network interface 701 may include any suitable wired or wireless network interfaces, including, but not limited to, Ethernet interfaces, T1 interfaces, USB interfaces, IEEE 802.11b interfaces, IEEE 802.11g interfaces, and the like.

Processor 703 may comprise a DSP), general purpose microprocessor, a programmable logic device, or an ASIC and may be configured to execute Motorola Solution™'s Orchestrate™ and Ally™ dispatch and incident management software which may be stored at the storage component 702. The execution of such software may allow users of the GUI 704 to generate workflows (i.e., actions and their associated responses) by receiving user inputs at the GUI 704 that define various triggers and their associated actions, which will ultimately be uploaded to the workflow server 102 and stored as data 612 in the storage component 602.

The storage component 702 may comprise standard memory (such as RAM, ROM, and the like) and serves to store instructions as software. Particularly, Motorola Solution™'s Orchestrate™ and Ally™ dispatch and incident management software may be stored at the storage component 702.

The GUI 704 generally provides a man/machine interface for receiving an input from a user and displaying information. For example, the GUI 704 may provide a mechanism of conveying (e.g., displaying) user-generated workflows. Thus, the GUI 704 may also provide a mechanism for a user to input workflows into a displayed form. In order to provide the above features (and additional features), the GUI 704 may include any combination of a display screen 705 (e.g., a computer screen, which may include a touch screen, a monitor, and the like) and any suitable combination of one or more input devices 706 (e.g., a keyboard and mouse combination).

Figure 8:
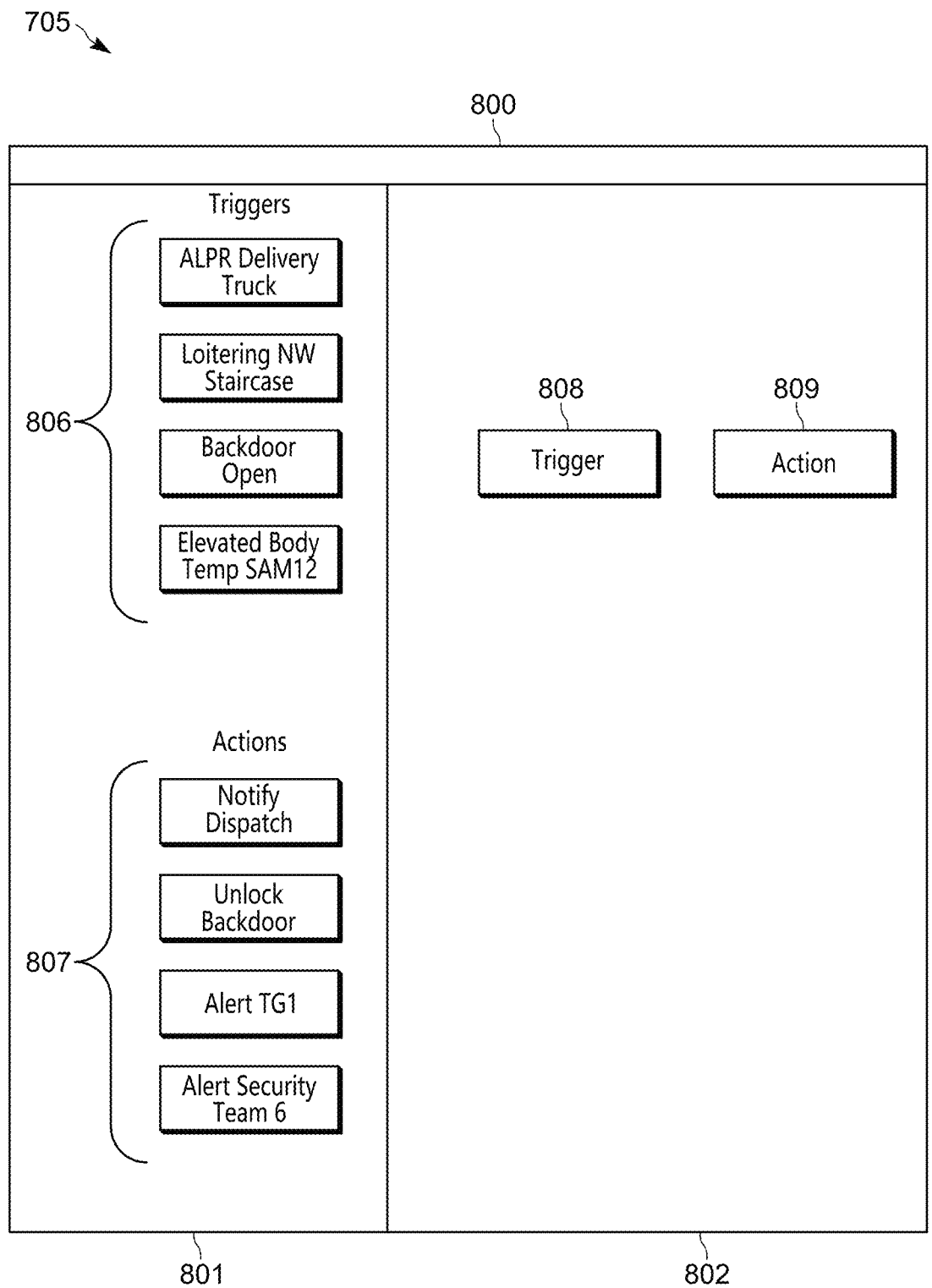
FIG. 8 depicts a dashboard for generating a workflow, in accordance with some examples.

FIG. 8 illustrates the generation of a workflow. More particularly, FIG. 8 illustrates a dashboard 800 rendered at the display screen 705 utilized for the generation of workflows. As depicted, the dashboard 800 consists of the following main components:

- a selection panel 801 (e.g., on a left-hand side), which lists available triggers 806 and actions 807;
- a workspace 802, which comprises a large area in the middle of the dashboard 800 used to generate workflows that define the connections between triggers and actions. Each workflow in the workspace is displayed as a separate field 808, 809 with an outline and a title. As shown in FIG. 8, two fields 808, 809 are shown, one labeled "trigger" and another labeled "action".

While the dashboard 800 is depicted in a particular configuration, the dashboard 800 may have any suitable configuration; for example, the selection panel 801 may be on a right-hand side, a top side or a bottom side relative to the workspace 802.

The triggers 806 represent the events originating from various sensors, software, and devices within the security ecosystem 100. The actions 807 represent the possible responses to the triggers that may be implemented via any suitable various sensors, software, and devices within the security ecosystem 100, including, but not limited to, the radios 137 and 153.

After a workflow is deployed (i.e., uploaded to the workflow server 102), its actions activate when the triggers occur. Triggers and actions appear on the workspace after they are dragged and dropped from the triggers 806 and actions 807 tabs respectively. For example, as depicted, the field 808 represents a trigger 806 that may have been dragged and dropped to the workspace 802 and the field 809 represents an action 807 that may have been dragged and dropped to the workspace 802. Connecting the triggers and actions on the workspace (as described below) will generate a workflow.

The triggers 806 and the actions 807 are generally stored at the storage component 702 and represent integrations across multiple products. In other words, triggers 806 and the actions 807 comprise triggers and actions for any suitable components available in the security ecosystem 100. This includes cameras, sensors, IoT devices, radios, etc. As administrators add additional technology pieces to the security ecosystem 100, those pieces may be automatically made available for workflow generation as discussed herein.

In order to associate a trigger 806 with an action 807 in the workspace 802, a user selects a trigger 806 from all possible triggers 806, and drags and drops it onto workspace 802, as represented by the field 808. The user then selects an action 807 for the trigger 806 that is in the workspace 802, and drags and drops it onto workspace 802. Once in the workspace 802, a trigger 806 may be referred to as a trigger node, and an action 807 may be referred to as an action node. In order to associate the trigger 806 with the action 807, they are connected. To connect a trigger node to an action node, a user may click an end of the trigger node (e.g., that is closest to the action node) and drag a line to the action node, or vice versa. However, any suitable process for connecting nodes is within the scope of the present specification.

Figure 9:
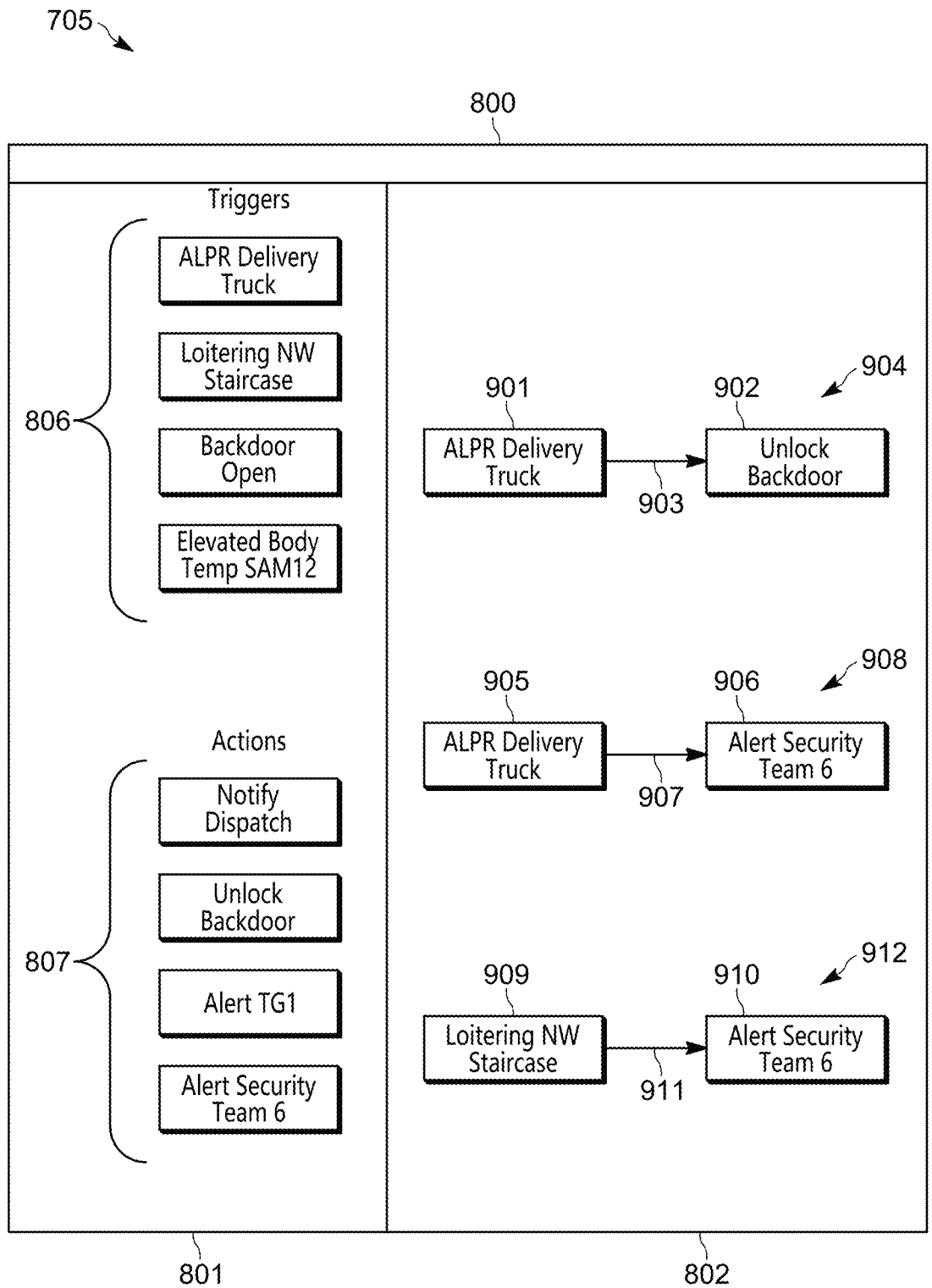
FIG. 9 depicts the dashboard of FIG. 8 with an example workflow, in accordance with some examples.

As shown in FIG. 9, which depicts the dashboard 800 in use, a trigger "ALPR Delivery Truck" 901 has been associated with an action "Unlock Backdoor" 902 by dragging a line 903 between the two, thereby forming a workflow 904. While only one trigger 901 and one action 902 is depicted in the workflow 904, the workflow 904 may comprise any suitable number of triggers (e.g., a trigger group) and any suitable numbers of associated action (e.g., an action group). Hence, if any of the triggers within a trigger group occurs, the workflow 904 is initiated causing the action to be executed. For example, as depicted ALPR stands for automated license plate reader, which may be one of the IoT devices 163; as such, according to the workflow 904, when automated license plate reader of the access control system 160 "reads" a license plate of a delivery truck (e.g., the trigger 901), an associated backdoor (e.g., of a warehouse) is opened; such a backdoor may also comprise one of the IoT devices 163. While not depicted, a memory in the security ecosystem 100 may also store a list of license plates for which the backdoor is to be opened and the trigger 901 may include comparing a number of the license plate that is read with license plates in such a list, such that the backdoor is opened only when the license plate is on the list.

Furthermore, it is understood that the security ecosystem 100 may comprise a plurality of IoT devices 163 that are automated license plate readers, and that the trigger 901 may be for a particular automated license plate reader; as such, while not depicted, the actions 807 may include respective "ALPR" actions 807 for other automated license plate reader. Similarly, it is understood that the security ecosystem 100 may comprise a plurality of IoT devices 163 that are backdoors, and that the action 902 may be for a particular backdoor; as such, while not depicted, the actions 807 may include respective "Unlock Backdoor" actions 807 for other backdoors.

For example, as depicted the triggers 806 include a trigger 806 for detecting loitering at a particular "North West" (e.g., NW) staircase of a particular building (e.g., "Loitering NW Staircase") that may be detected using a VAE 143 of one or more cameras 142 and the like. The triggers 806 further includes a trigger 806 for detecting whether a particular backdoor is open (e.g., "Backdoor Open") that may be detected using a VAE 143 of one or more cameras 142 and/or an open/closed sensor on the backdoor and the like. The triggers 806 further includes a trigger 806 for detecting whether a particular individual, for example a first responder and/or police officer and/or security guard having an identifier "SAM12" has an elevated body temperature (e.g., "Elevated Body Temp SAM12") that may be detected using a biometric sensor of one or more sensors 138 and the like.

For example, as depicted the actions 807 include an action 807 for notifying a first responder and/or police and/or security dispatch (e.g., "Notify Dispatch") such as the dispatch center 131. The actions 807 further include an action 807 for alerting a particular talkgroup identified by the identifier TG1 and/or Talkgroup #1 (e.g., "Alert TG1") such as a particular talkgroup of the radios 137 (and/or the radios 153). The actions 807 further includes an action 807 for alerting a particular security team identified by the identifier Security Team 6 (e.g., "Alert Security Team 6") which may be associated with a particular group of the radios 137 (and/or the radios 153) and which may, or may not, be associated via a talkgroup.

However, the triggers 806 and actions 807 may include any suitable triggers and actions, which may be dragged and dropped, and the like, into the workspace 802, and associated with each other to generate workflows.

For example, as also shown in FIG. 9, the trigger "ALPR Delivery Truck" 806 may be added to the workspace 802 a second time from the selection panel 801, as a trigger "ALPR Delivery Truck" 905, and associated with a different action "Alert Security Team 6" 906 (e.g., added as an action 807 from the selection panel 801) by dragging a line 907 between the two, thereby forming a workflow 908. Such an example illustrates that a given trigger 806 may be used more than once to generate a workflow 904, 908, in association with different actions 807. Similarly, a given action 807 may be used more than once in the workspace 802 to form workflows with different triggers 806.

Similarly, as also shown in FIG. 9, the trigger "Loitering NW Staircase" 806 may be added to the workspace 802 from the selection panel 801, as a trigger "Loitering NW Staircase" 909, and associated with action "Alert Security Team 6" 910 (e.g., added as an action 807 from the selection panel 801) by dragging a line 911 between the two, thereby forming a workflow 912. Such an example illustrates that a given action 807 may be used more than once to generate a workflow 908, 912, in association with different triggers 806.

Figure 10:
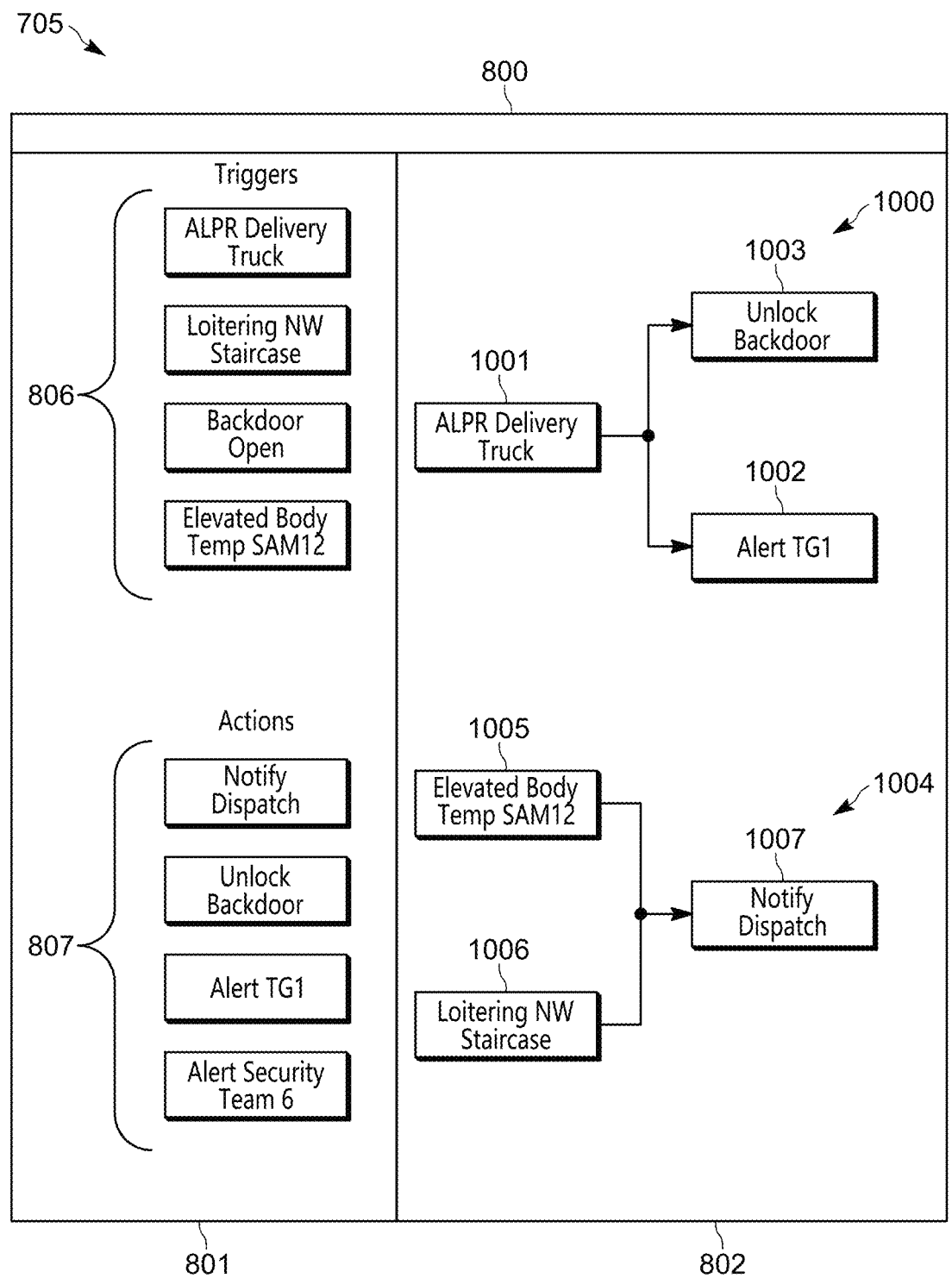
FIG. 10 depicts the dashboard of FIG. 8 with other example workflows, in accordance with some examples.

As illustrated in FIG. 10, a single trigger may be associated with multiple actions in a workflow. Thus, in an illustrated workflow 1000, a trigger 1001 of "ALPR Delivery Truck" may be associated with an action 1003 of "Unlock Back Door" 1003 as well as associated with an action 1002 of "Alert TG 1". When the workflow 1000 is uploaded to the workflow server 102, and the automatic license plate detects a delivery truck, workflow server 102 will cause both the back door to unlock and an alert to be sent on Talkgroup #1.

In a similar manner multiple triggers may be associated with a single action. Thus, in an illustrated workflow 1004, both a trigger 1005 of "Elevated Body Temp SAM 12" and a trigger 1006 of "Loitering NW Staircase" will cause an action 1007 of "Notify Dispatch". When the workflow 1004 is uploaded to the workflow server 102, the workflow server 102 notifies the dispatch center when either a police officer (and the like) identified by the identifier "SAM 12" has an elevated body temperature (e.g., above a threshold body temperature", or when loitering is detected in the NW staircase.

As mentioned above, it may be challenging to communicate to the one or more communication devices the sensor data that lead to the one or more triggers and/or to change and/or control the safety workflows. It is also challenging to test and verify changes in the physical equipment and associated software in any of systems 130, 140, 150 and 160 during normal continuous operation of the security ecosystem.

In order to address such a problem, the workflow server 102 may be adapted to: monitor execution of a safety workflow, the safety workflow comprising one or more triggers and one or more responsive actions; provide, at a display screen, an indication of the safety workflow and respective visual indications of: a physical sensor that generated sensor data of a trigger of the safety workflow; and a communication device associated with a responsive action to the trigger; detect, via an input device, an interaction with one or more of the respective visual indications to interact with one or more of the physical sensor and the communication device; and based on the interaction, one or more of: retrieve the sensor data; initiate communication with the communication device; and send the sensor data to the communication device.

In addition, the workflow server 102 may be adapted to test and verify the operation of computer subsystems 130, 140, 150 and 160 by determining that changes have occurred at one or more of these subsystems and then, working with the computer subsystems, perform these tests at appropriate times and in the appropriate order. The timing of such tests will take into consideration both historical and current operation of these computer subsystems, with the flexibility to re-schedule and re-prioritize testing and verification, as appropriate.

Hereafter, workflows may be interchangeably referred to as safety workflows as it is understood that workflows as described herein may be used to implement procedures and/or processes related to safety and/or public safety of persons and/or personnel, for example at a school, a hospital, an airport, a sporting event, a stadium, a factory, a warehouse and/or any other suitable location and/or building and the like. Hereafter, the workflow server 102 may be interchangeably referred to as a computing device (e.g., which may be implemented as one or more computing devices, one or more servers, one or more cloud computing devices, and the like). Hereafter, it is understood that any of the sensors 138, cameras 142, and IoT devices 163 comprise physical sensors that may generate sensor data that may be provided to the workflow server 102 to determine whether a trigger has occurred.

However, the security ecosystem 100 and safety workflows provided herein may be further adapted to include other features.

Figure 11:
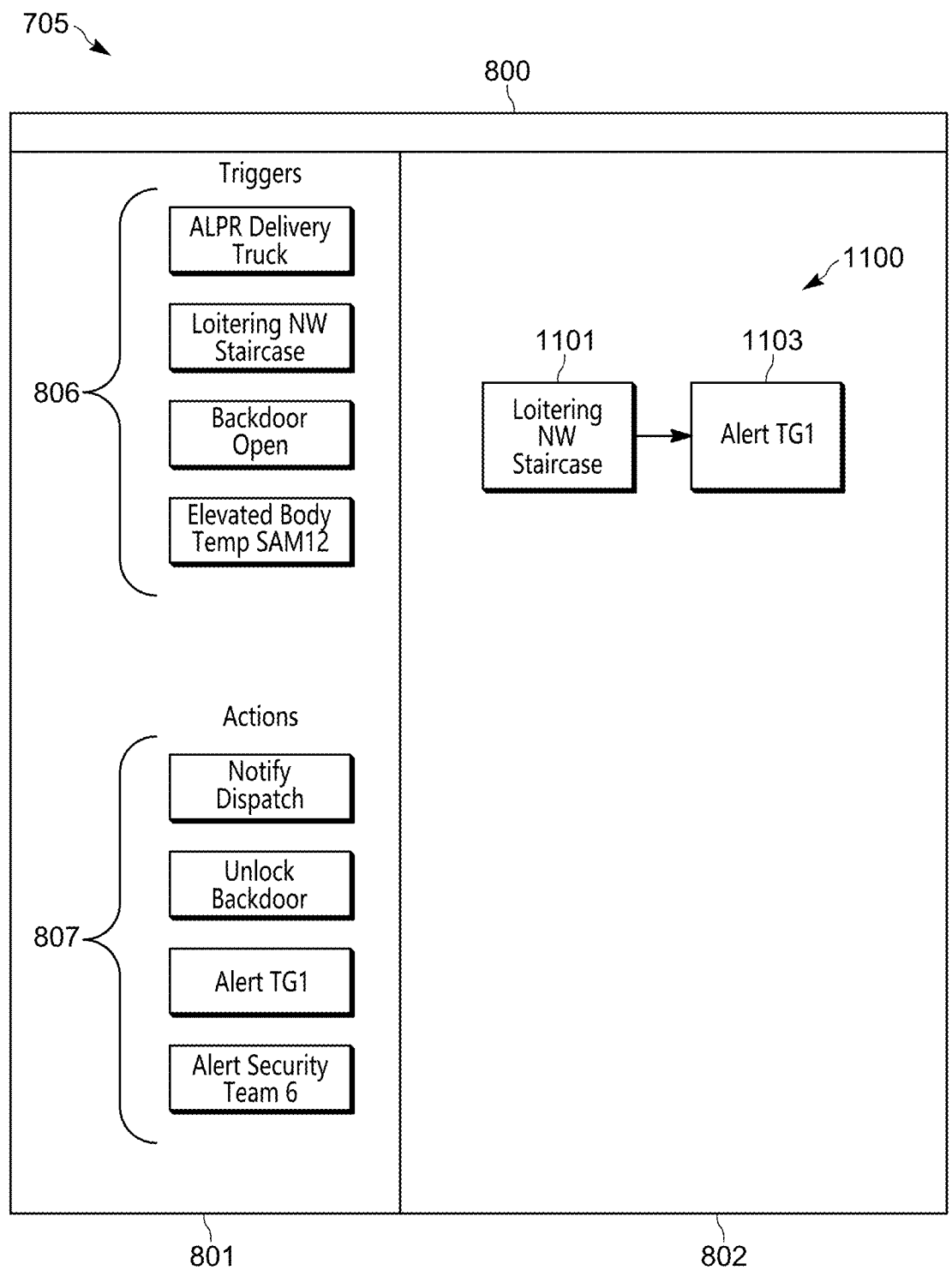
FIG. 11 depicts the dashboard of FIG. 8 with an example workflow to be verified, in accordance with some examples.

For example, as illustrated in FIG. 11, a trigger may result in a message being transmitted to a talkgroup, and further responsive actions may occur depending on whether transmission and/or delivery of the message to the talkgroup succeeds or fails, for example in a process for verifying a workflow.

In particular, as depicted, a workflow 1100 includes a trigger 1101 of "Loitering NW Staircase" and a responsive action 1103 of "Alert TG1". In particular, the responsive action 1103 results in a message being transmitted to communication devices of a particular talkgroup (e.g., Talkgroup #1) of radios which may include, but are not limited to, a talkgroup of the radios 137 and/or the radios 153. Such a message may include a text message of any suitable format and/or content, such as "Loitering on NW Staircase Detected" as well as an address of the building at which the staircase is located.

Hereafter, examples will be described with respect to the private radio system 150, and will refer to one or more radios 153 being members of a talkgroup, such as the Talkgroup #1 of the action 1103, as well as the system infrastructure 152. However, methods and examples described herein may alternatively be applied to public-safety network 130, the radios 137 being members of a talkgroup, and the RAN 135. However, methods and examples described herein may alternatively be applied to combinations of the network 130 and the system 150, combinations of the radios 137, 153 and combinations of the system infrastructure 152 and the RAN 135.

Furthermore, examples will be described with respect to the cameras 142 and/or the VAEs 143 of the video surveillance system 140 being used to determine whether the trigger 1101 has occurred.

For example, when software and/or hardware of one or more of the cameras 142 and the radios 153 has been upgraded, the workflow server 102 may verify that the workflow 1100 remains functional. Such verification may further rely on a talkgroup of the radios 153 confirming that a message has been received.

Using the example of the system 150, when a message is transmitted to a talkgroup of the radios 153 via the system infrastructure 152, the system infrastructure 152 may operate according to one of a plurality of different message confirmation processes.

For example, the system infrastructure 152 may operate according to an acknowledgement confirmation process in which communication devices affiliated with a talkgroup acknowledge a message when received. In particular, the radios 153 may, when a message is received, acknowledge the message by transmitting such an acknowledgement. Furthermore, such acknowledgements may occur via polling of the communication devices affiliated with the talkgroup. It is understood that the acknowledgement confirmation process may further depend on whether or not there are communication devices affiliated with the talkgroup, and that, when no communication devices are affiliated with the talkgroup, the system infrastructure 152 may alternatively implement a non-acknowledgement confirmation process, as described hereafter.

In particular, talkgroup affiliation is understood to be a process in which communication devices register with components of a network as currently being associated with and/or tuned to the talkgroup (and/or a channel thereof). Hence, when a network supports talkgroup affiliation, components of such a network may maintain lists of communication devices that are currently affiliated with a talkgroup.

However, in other examples, the system infrastructure 152 may operate according to a non-acknowledgement confirmation process in which communication devices communicating over a talkgroup do not acknowledge a message when received. Indeed, in these examples, the system infrastructure 152 may not support talkgroup affiliation, but rather messages transmitted on a talkgroup are transmitted over a channel and communication devices tuned to the channel receive the message; however, components of the system infrastructure 152 may not generally maintain lists of which communication devices are currently tuned to a channel of the talkgroup. Furthermore, in these examples, while the system infrastructure 152 may not support talkgroup affiliation, a radio 153 may be configured to communicate via one or more talkgroups, for example using a radio channel selector that may be used to "tune" the radio 153 to one or more channel positions corresponding to respective channels of respective talkgroups. Nonetheless, components of the system infrastructure 152 may indicate that the message was transmitted. Hence, in some examples, the system infrastructure 152 may operate according to a non-acknowledgement confirmation process and without talkgroup affiliation; in these examples, the system infrastructure 152 does not operate according to the acknowledgement confirmation process.

In yet other examples, the system infrastructure 152 may operate according to a radio-frequency (RF) based confirmation process in which power, and the like, of RF signals are monitored in a given time period following transmission of a message to communication devices (e.g., the time period comprising a time slot in which the communication devices may reply to the message). When the RF signals (e.g., a power of the RF signals) are above (e.g., or equal to) a given threshold, delivery of the message may be determined to be successful; however, when the RF signals (e.g., a power of the RF signals) are below the given threshold, delivery of the message may be determined to be a failure. In particular, power (and the like) of the RF signals may indicate whether, or not, the communication devices are replying to the message, and the given threshold may be selected to correspond with a strength (e.g., with respect to power) of an RF signal of a reply to the message by one or more of the communication devices. The given threshold may be determined heuristically. It is understood that, in these examples, components of the system infrastructure 152 are configured to measure power, and the like, of RF signals on a channel that corresponds to a talkgroup.

The term "channel" and/or "communication channel", as used herein, includes, but is not limited to, a physical radio-frequency (RF) communication channel, a logical radio-frequency communication channel, a trunking talkgroup (interchangeably referred to herein a "talkgroup"), a trunking announcement group, a VOIP communication path, a push-to-talk channel, and the like. Indeed, groups of channels may be logically organized into talkgroups, and/or dynamically allocated into talkgroups, though channels in a talkgroup may be dynamic as the traffic (e.g., communications) in a talkgroup may increase or decrease, and channels assigned to the talkgroup may be adjusted accordingly. Furthermore, talkgroups may be used in non-trunking communication systems as well as trunking communication systems.

It is further understood that, when a message is transmitted in conjunction with implementing the responsive action 1103, the workflow server 102 has no "knowledge" of a type of network over which communication devices of the associated talkgroup are communicating. Hence determining whether the message of the responsive action 1103 has been one or more of transmitted and delivered to the communication devices may be challenging as how such a determination is implemented is generally dependent on a type of network over which the devices communicate.

Figure 12:
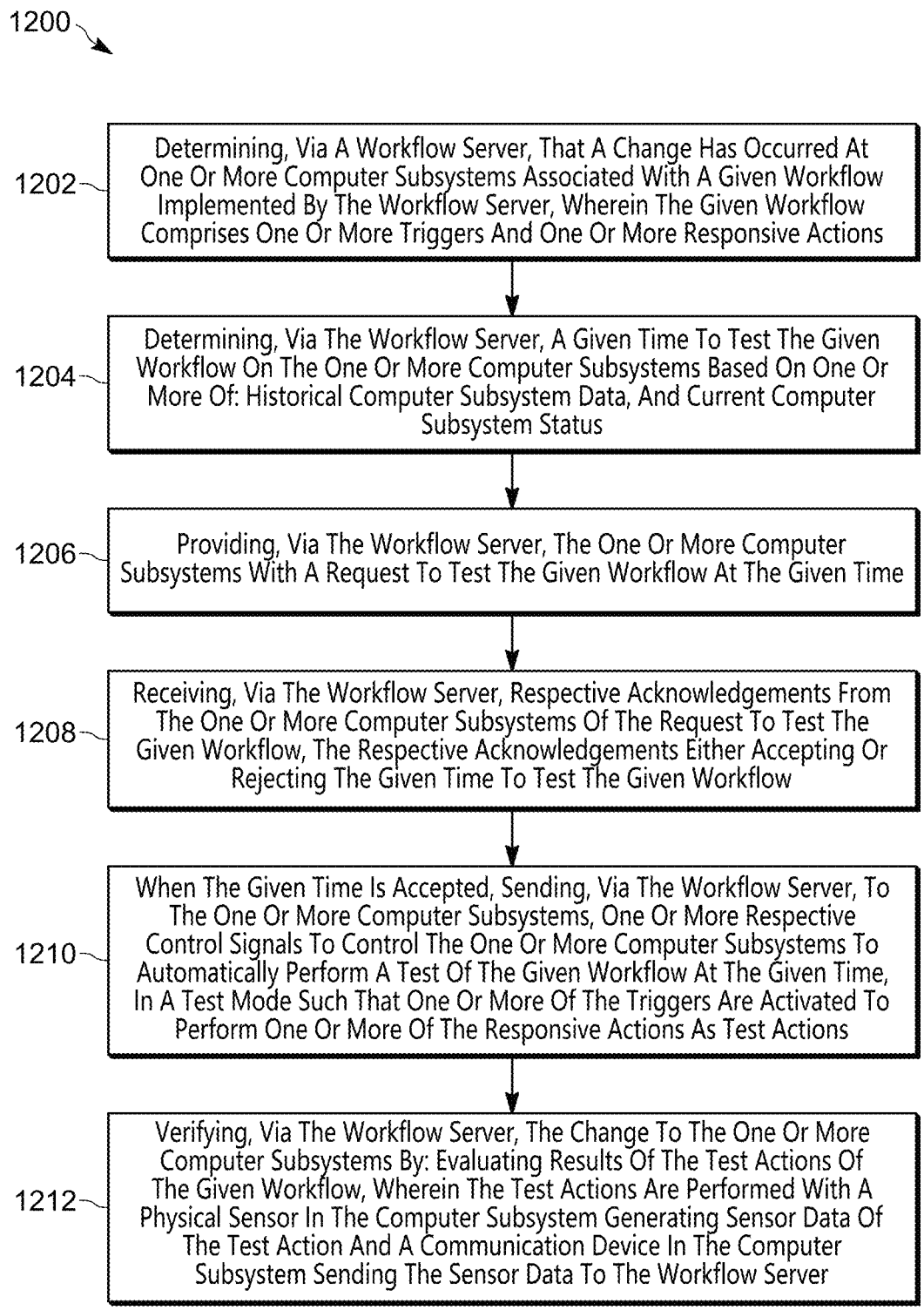
FIG. 12 depicts a flowchart of a method for improving computer system operations by testing and verifying operation of changed computer subsystems, in accordance with some examples.

Attention is next directed to FIG. 12 which depicts a flowchart of a method for improving computer system operations by testing and verifying operation of changed computer subsystems, in accordance with some examples. In particular, the operations of the method 1200 of FIG. 12 correspond to machine readable instructions that are executed by the workflow server 102 and the various computer subsystems, preferably including public-safety network 130, video surveillance system 140, private radio system 150 and access control system 160.

A network interface 601 and one or more processors 603 at workflow server are generally configured to receive messages and information and/or indications associated with messages from various gateways, systems, and networks (e.g., of the security ecosystem 100). Processor 603 may comprise a digital signal processor (DSP), a general purpose microprocessor, a programmable logic device, or an application specific integrated circuit (ASIC), and the like.

In the illustrated example, the instructions are represented by the blocks of FIG. 12 and may be stored in a storage component at workflow server 102. The method 1200 of FIG. 12 is one way that the processor and/or the workflow server 102 and/or the security ecosystem 100 may be configured. Furthermore, the following discussion of the method 1200 of FIG. 12 will lead to a further understanding of the security ecosystem 100, and its various components.

The method 1200 of FIG. 12 need not be performed in the exact sequence as shown and likewise various blocks may be performed in parallel rather than in sequence. Accordingly, the elements of method 1200 are referred to herein as "blocks" rather than "steps." The method 1200 of FIG. 12 may be implemented on variations of the security ecosystem 100 of FIG. 1, as well.

At block 1202, a determination is made, via the workflow server 102, that a change has occurred at one or more computer subsystems (130, 140, 150, 160) associated with a given workflow implemented by the workflow server. The change may be made determined either via notification from the changed subsystem or by polling each subsystem state via the workflow server. The change may be a replacement or reconfiguration of the physical components of the system such as a newly installed radio 137 or 153, sensor 138, camera 142, IoT device 163, etc. In addition, the change may be due to a software update to such components. The given workflow comprises one or more triggers 806 and one or more responsive actions 807 (see FIGS. 8 to 10).

At block 1204, a determination is made, via the workflow server, of a given time to test the given workflow on the one or more computer subsystems (130, 140, 150, 160) based on one or more of: historical computer subsystem data, and current computer subsystem status. For example, workflow server 102 may determine that the best time to test a newly installed loading bay camera is at a time when deliveries are typically not being made. Another example would be to test a school entrance camera at a time when school is not typically in session (after normal business hours or on a weekend).

At block 1206, the one or more computer subsystems (130, 140, 150, 160) are provided, via the workforce server, with a request to test a given workflow at the given time.

At block 1208, respective acknowledgements are received, via the workflow server 102 from the one or more computer subsystems (130, 140, 150, 160) of the request to test the given workflow. These respective acknowledgements either accept or reject the given time to test the given workflow. For example, if the desired test of a new loading bay camera were suggested by workflow server 102 to be at a time that deliveries are not expected, the computer subsystem 140 controlling the camera would accept the request to test the loading bay camera at that time. However, if a late or unexpected delivery showed up in the loading bay at that time, the computer subsystem 140 controlling the camera would instead reject the request to test the loading bay camera at that time. As such, the computer subsystem (130, 140, 150 or 160) making the determination whether to accept or reject the test time proposed by the workflow server 102 would look both at current subsystem operation (i.e.: is the computer subsystem in actual use performing security activity at the requested test time), and also historical subsystem operation (i.e.: is the computer subsystem normally performing security activity at the requested test time). Similarly, if the workflow server 102 suggested a time for testing a school video camera and this time was during a normally scheduled change of classes period, the video subsystem 140 would reject this proposed test time on the basis of historical video use operation.

At block 1210, on the condition that the given time selected by workflow server 102 to test the given workflow has been accepted by the one or more computer subsystems (130, 140, 150, 160), the workflow server 102 then sends one or more respective control signals to control the one or more computer subsystems (130, 140, 150 160) to automatically perform a test of the given workflow at the given time. In preferred aspects, the test is performed in a test mode such that one or more of the triggers 806 are activated to perform one or more of the responsive actions 807 as test actions.

Finally, at block 1212, the change to the one or more computer subsystems (130, 140, 150 160) is verified, via the workflow server 102, by: evaluating results of the test actions of the given workflow. In preferred aspects, these test actions are performed with a physical sensor in the computer subsystem (130, 140, 150 or 160) generating sensor data of the test action and a communication device in the computer subsystem sending the sensor data to workflow server 102. For example, the physical sensor may be any sensor 138 in public-safety subsystem 130, camera(s) 142 in video subsystem 140, radio 153 in private radio system 150 or IoT device 163 in access control subsystem 160. Other sensors and communication systems may also be included, all keeping within the scope of the presently claimed system. In optional aspects, the present system further comprises synchronizing a database/storage component 602 in workflow server 102 with a respective database 149 or 159 in the one or more computer subsystems (130, 140, 150 or 160) based on the evaluating of the results of the test(s).

As stated above, the one or more computer subsystems (130, 140, 150 or 160) accept or reject the given time to test the given workflow is based on one or more of: respective historical subsystem data; and respective current subsystem status. The ability to look at both current system operation and records of past system operation (i.e.: historical data) has the advantage of being able to best prioritize and queue the testing of multiple workflows. As such, the computer subsystems themselves work with the workflow server 102 to determine the best times to test the changes that are made to these computer subsystems. The important advantage of having the computer subsystems look at their current operations when deciding whether to conduct the tests is that allowance is made for emergency situations. For example, if the present system determined that the best time to test a new school security camera was on a Sunday afternoon, and the system was about to start the test, the test could be immediately postponed or re-scheduled if there was a break-in detected by a school door sensor at that time.

In further preferred aspects, the present system also looks at "threshold conditions" (in addition to analyzing both historical and current subsystem operations). For example, in the case of a security camera in a hospital waiting room, it may be acceptable to test a camera 142 when the camera sees less than five people in the waiting room, and it may be unacceptable to test the camera when there are more than ten people in the waiting room. In accordance with the present system, an exemplary threshold of eight people may be set. As such, when the camera detects eight people in the waiting room, it may reject a proposed camera test at that time.

These threshold conditions can also be analyzed in conjunction with historical data. For example, when the camera detects there are eight people in the room, it may then look at historic data to see if it is more likely that additional people will arrive at this time or more likely that additional people will leave at this time. If it is determined to be likely that the number of people will soon increase from eight to ten, it may decide to reject proposed camera testing at this time. Conversely, if it is determined to be likely that the number of people will soon decrease from eight to five, it may decide to accept proposed camera testing at this time. In summary, the one or more computer subsystems (130, 140, 150 or 160) may accept or reject the given time to test the given workflow based on meeting respective threshold conditions for the triggers 806 of the test actions 807 corresponding to one or more of: respective historical subsystem data; and respective current subsystem status.

In further aspects of the present system, the one or more computer subsystems 130, 140, 150 and 160 reject the given time to test the given workflow when the given workflow is running (or is about to run) at the given time to test the given workflow. In further aspects of the present system, the one or more computer subsystems 130, 140, 150 and 160 reject the given time to test the given workflow when respective computer subsystem resources are not available at the given time to test the given workflow.

In accordance with the present system, each of the one or more computer subsystems 130, 140, 150 and 160 may propose an alternate given time to test the given workflow when the one or more computer subsystems reject the given time to test the given workflow. The determination of the alternate given time to test the given workflow is based on one or more of: respective historical subsystem data; and respective current subsystem status. As such, each of computer subsystems 130, 140, 150 and 160 may suggest alternate times to test the given workflow is based on meeting threshold conditions corresponding to one or more of: respective historical subsystem data; and respective current subsystem status.

In preferred aspects, determining that the change has occurred at the one or more computer subsystems associated with the given workflow comprises receiving an indication of the change from the one or more computer subsystems, the change comprising one or more of: a software upgrade; a replacement of one or more of components of a computer subsystem, or a reconfiguration of the computer subsystem components.

Attention is next directed to FIG. 13 through FIG. 17, which depicts an example of workflow server 102 of the security ecosystem 100 implementing the method 1200.

Figure 13:
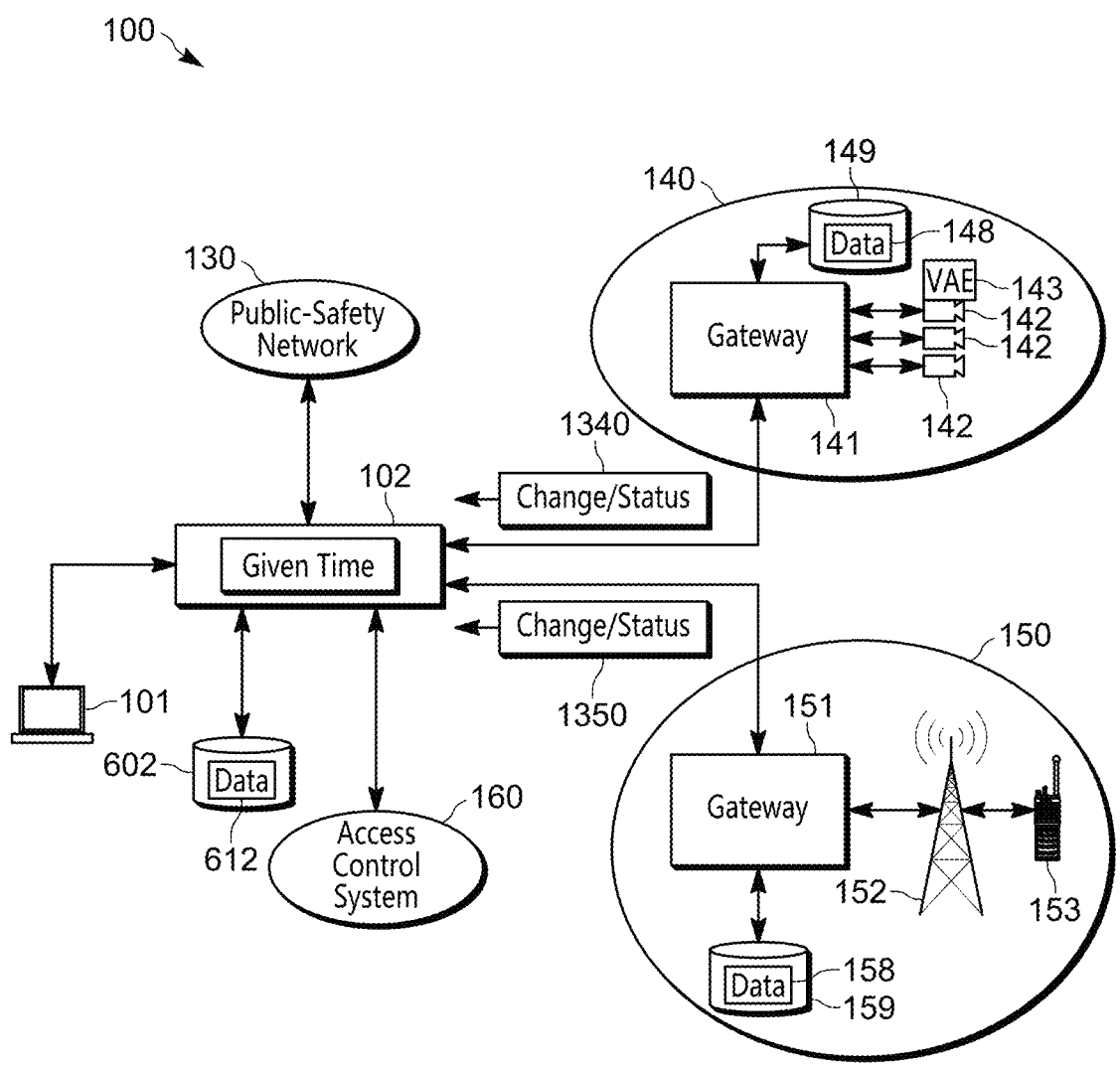
FIG. 13 depicts a security ecosystem capable of detecting a change in status of a computer subsystem, in accordance with some examples.

With attention first directed to FIG. 13, which depicts an example of the block 1202 of the method 1200, the workflow server 102 receives a status change 1340 from video surveillance system 140. This change in status may be, for example, the installation of a new camera 142, or a software update to VAE 143. This status change 1340 may be recorded as data 148 in database 149. In addition, workflow server 102 may also receive a status change 1350 from private radio system 150. This change in status may be, for example, the installation of a new radio 153 or the installation of new software on radio 153. This status change 1350 may be recorded as data 158 in database 159.

Figure 14:
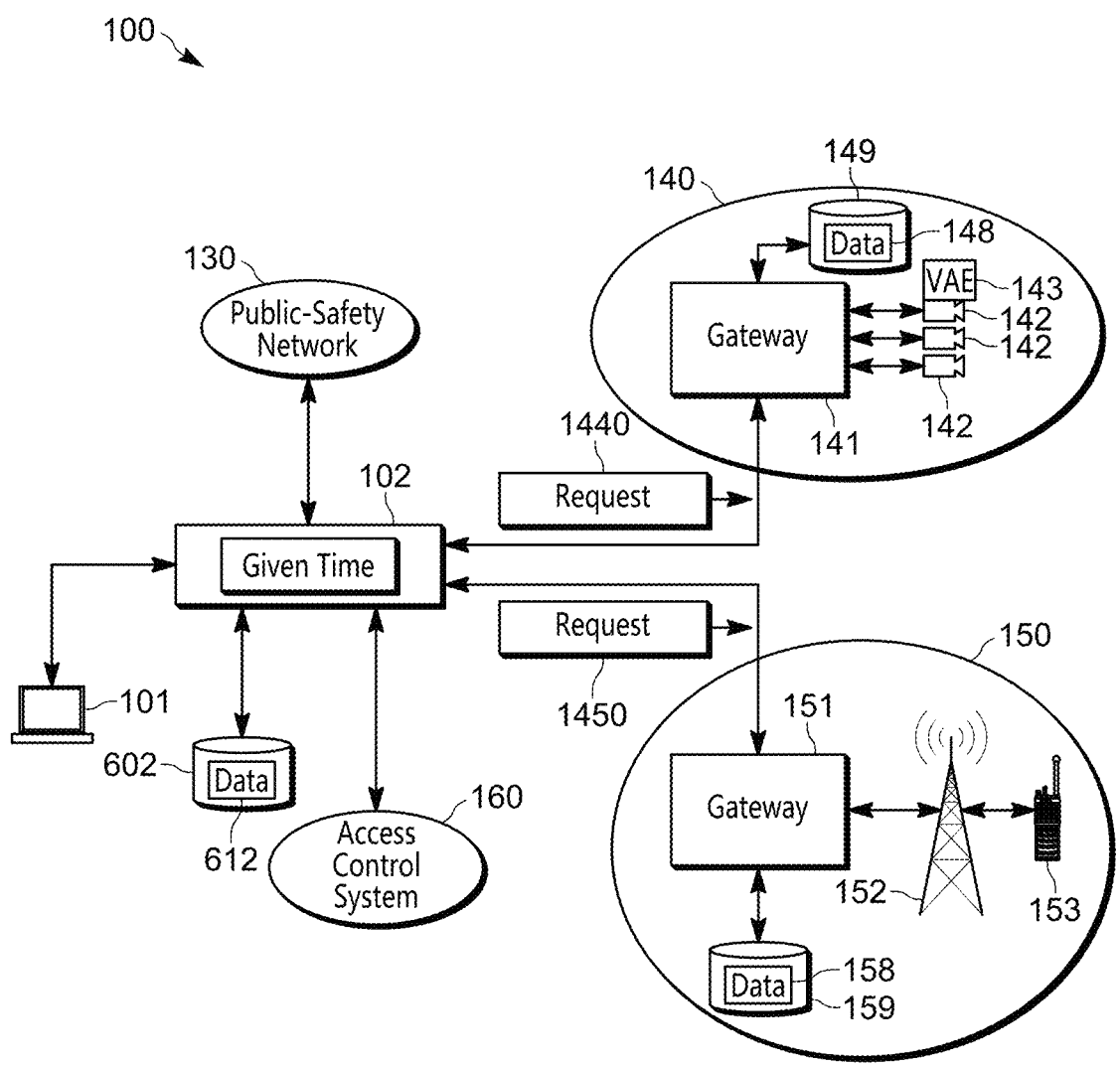
FIG. 14 depicts a security ecosystem with a workflow server capable of determining preferred times to test workflows, in accordance with some examples.

Attention is next directed to FIG. 14, which depicts an example of the blocks 1204, 1206 of the method 1200. Workflow server 102 determines a given time to test the workflows, such as the workflow 1100, by sending the request 1440 (with the given time to test therein) to video surveillance system 140. This request 1440 to test may be stored as data 148 in database 149. Workflow server 102 sends a similar request 1450 to test to private radio system 150. This request 1450 to test may be stored as data 158 in database 159.

Figure 15:
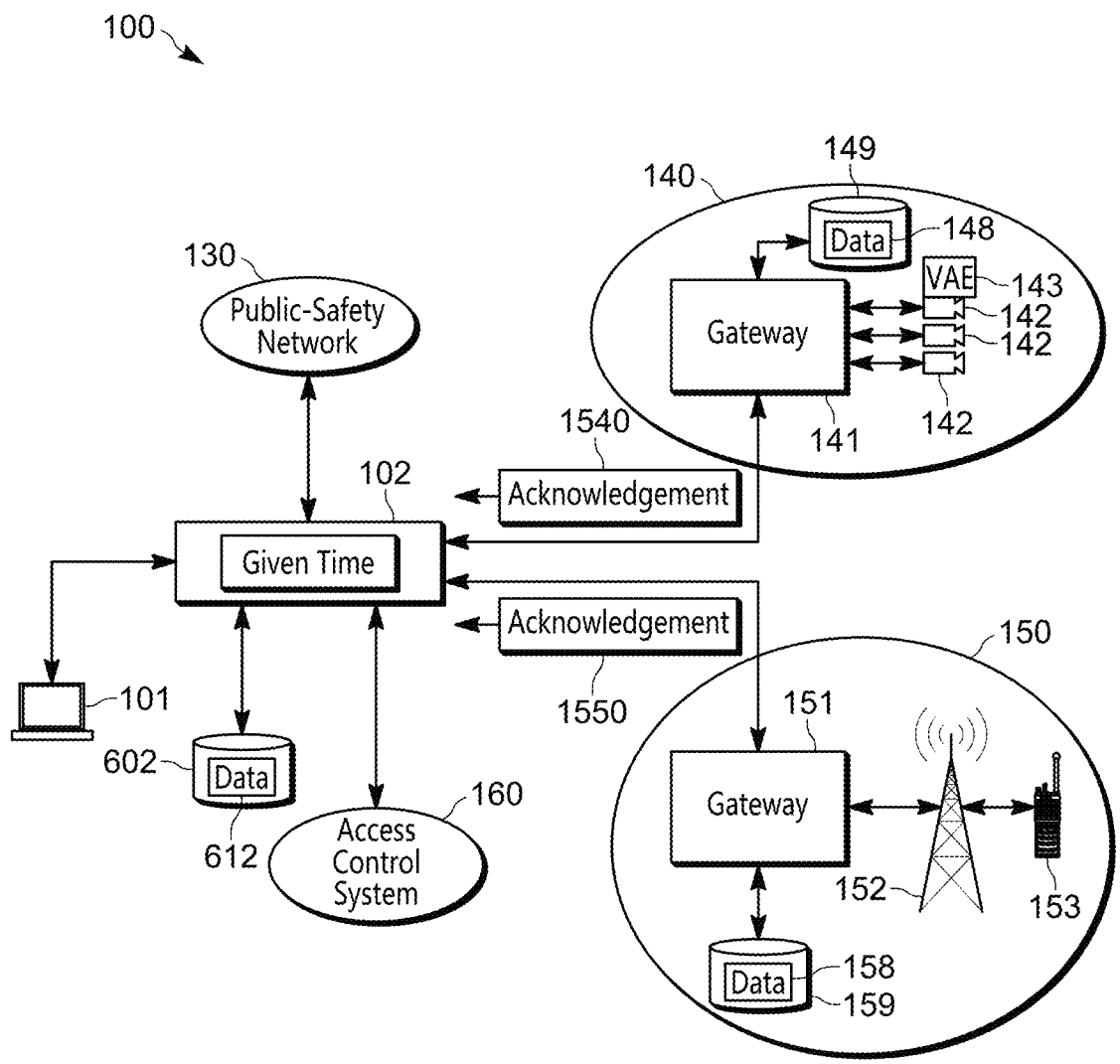
FIG. 15 depicts a security ecosystem with a workflow server capable of receiving test time acknowledgements from computer subsystems, in accordance with some examples.

Attention is next directed to FIG. 15, which depicts an example of the blocks 1208 of the method 1200. Workflow server 102 receives an acknowledgement 1540 from video surveillance system 140. Workflow server 102 also receives an acknowledgement 1550 from private radio system 150. Each of acknowledgements 1540 and 1550 will either accept or reject the respective given test time for testing the workflow at video surveillance system 140 or at private radio system 150. Such acceptance or rejection of the given test time(s) will be made by video surveillance system 140 or private radio system 150 using the methods and systems described herein, for example, determining or predicting computer subsystem operation, and possible testing conflicts at the given test times.

Figure 16:
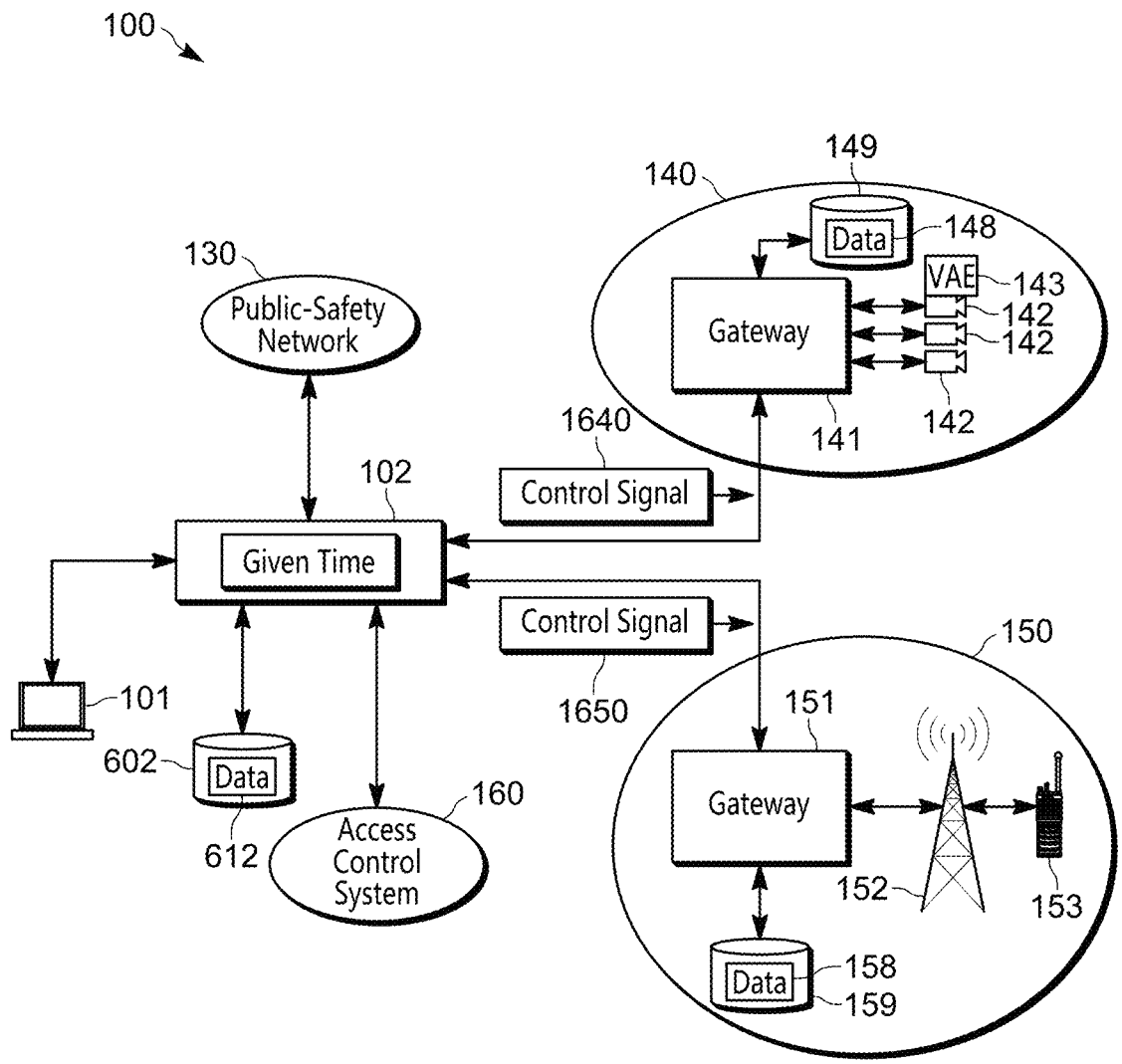
FIG. 16 depicts a security ecosystem with a workflow server capable of sending control signals to test computer subsystems, in accordance with some examples.

Provided that the video surveillance system 140 or private radio system 150 does accept the given test time(s) suggested by workflow server 102, the system moves to the condition illustrated in FIG. 16 which depicts a security ecosystem with a workflow server 102 capable of sending control signals to test computer subsystems 140 and 150. Specifically, FIG. 16 depicts an example of the block 1210 of the method 1200 in which a control signal 1640 is sent to video surveillance system 140 instructing video surveillance system 140 to test the workflow, such as the workflow 1100, for example by instructing the video surveillance system 140 to implement the trigger 1101. Similarly, a control signal 1650 is sent to private radio system 150 instructing private radio system 150 to test the workflow, such as the workflow 1100, for example by instructing the private radio system 150 to implement the action 1103. These workflow tests are preferably run in a "test mode" as described herein with the system operators being made aware that a test is operation, and that this is not an actual emergency. More broadly, testing may include the triggers 806 performing respective actions 807 (e.g., that are related in workflows) in a test mode.

Figure 17:
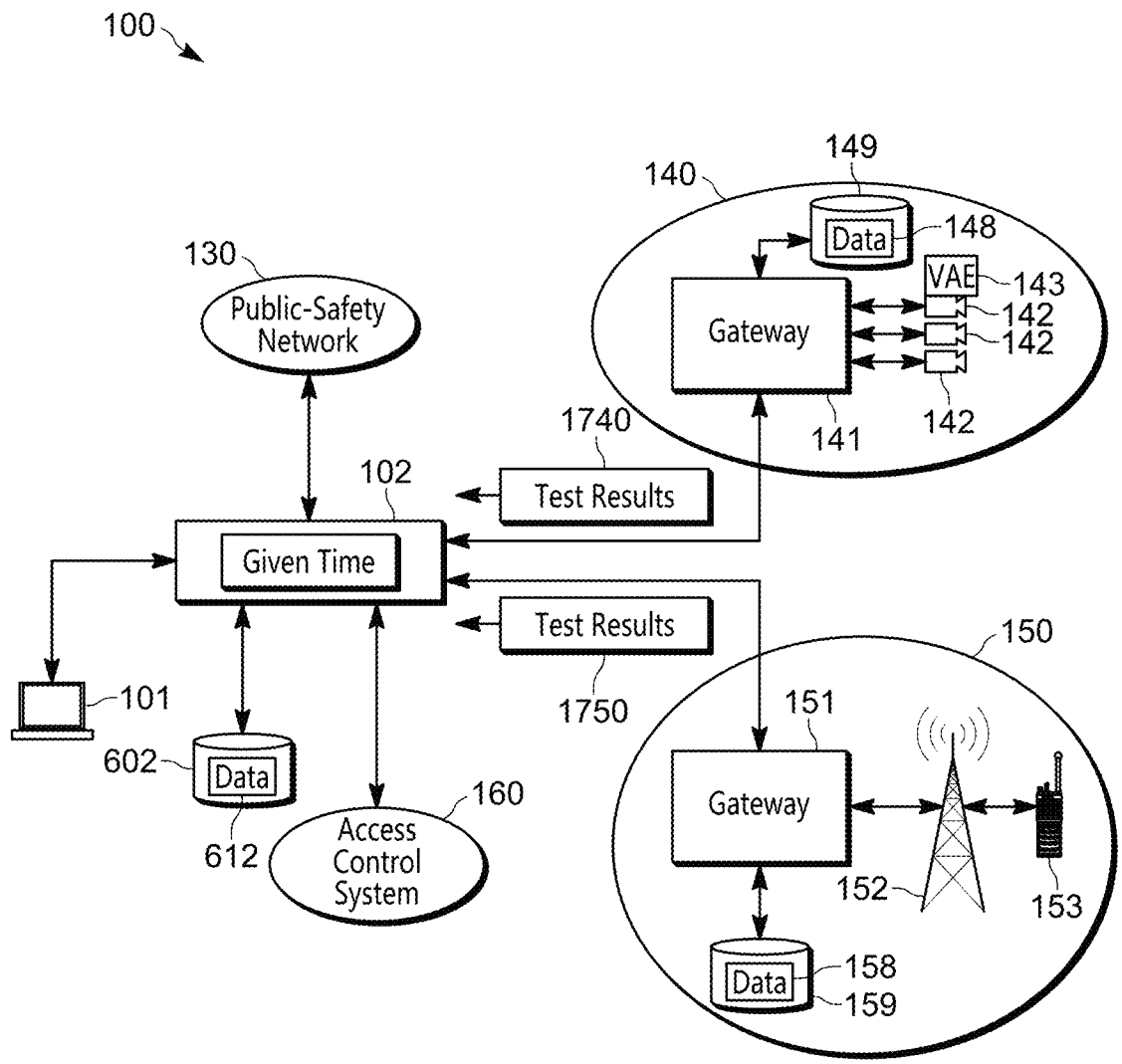
FIG. 17 depicts a security ecosystem capable of receiving test results sent by gateways in computer subsystems and verifying the test results, in accordance with some examples.

Attention is next directed to FIG. 17, which depicts an example of the block 1212 of the method 1200. Workflow server 102 receives test results 1740 from gateway 141 in video surveillance system 140. Workflow server 102 also receives test results 1750 from gateway 151 in private radio system 150. The rest results 1740, 1750 may generally indicate whether or not triggers and/or actions were successfully implemented by the systems 140, 150. For example the test results 1740 may indicate that software and/or hardware that were operated by the video surveillance system 140 upon receipt of the control signal 1640 performed the functionality of the trigger 1101. Similarly, the test results 1750 may indicate that software and/or hardware that were operated by the private radio system 150 upon receipt of the control signal 1650 performed the functionality of the action 1103.

After receiving test results 1740 and 1750, workflow server verifies these results. For example, verification may include, but is not limited to, processing the test results 1740, 1750 to verify that software and/or hardware operated by the systems 140, 150 performed the functionality indicated by the control signal 1640, 1650.

Such verification ensures that a workflow conflicts do not exist and/or that the various computer subsystem remain in a proper operational state after the physical components of such systems (including radios, cameras and locking systems), and the software running thereon that have been changed, for example, by being replaced, reconfigured or having their software updated. Verification ensures that future execution of workflows as they arise do not cause problems with computer subsystem interoperability. The results of such verifications performed by workflow server 102 can be stored as data 612 in the storage component 602, as desired. The results of such verifications performed by workflow server 102 can also be displayed onscreen to system operators on workstation 101.

The present system also provides devices to accomplish each of the above described methods. Such devices preferably comprise a network interface and a processor. In one exemplary device, the processor is configured to: determine, via a workflow server, that a change has occurred at one or more computer subsystems associated with a given workflow implemented by the workflow server, wherein the given workflow comprises one or more triggers and one or more responsive actions; determine, via the workflow server, a given time to test the given workflow on the one or more computer subsystems based on one or more of: historical computer subsystem data, and current computer subsystem status; provide, via the workflow server, the one or more computer subsystems with a request to test the given workflow at the given time; receive, via the workflow server, respective acknowledgements from the one or more computer subsystems of the request to test the given workflow, the respective acknowledgements either accepting or rejecting the given time to test the given workflow; and when the given time is accepted, sending, via the workflow server, to the one or more computer subsystems, one or more respective control signals to control the one or more computer subsystems to automatically perform a test of the given workflow at the given time, in a test mode such that one or more of the triggers are activated to perform one or more of the responsive actions as test actions; and verify, via the workflow server, the change to the one or more computer subsystems by: evaluating results of the test actions of the given workflow, wherein the test actions are performed with a physical sensor in the computer subsystem generating sensor data of the test action and a communication device in the computer subsystem sending the sensor data to the workflow server.

In further aspects of the present system, the workflow server 102 determines that changes have occurred at more than one of the computer subsystems (130, 140, 150 and 160). When this occurs, workflow server 102 will send proposed test times to each of the computer subsystems in question giving them proposed test times for their particular workflows. As such, workflow server 102 will optionally prioritize and queue the testing of a number of different workflows.

Given that the same workflow may affect different computer subsystems and that each of the various computer subsystems may accept or reject the proposed test times for their various components (and may also suggest different more appropriate test times for their various components), workflow server 102 constantly juggles test times and verification procedures. For example, workflow server 102 may determine an appropriate test time for a building locking system in access control computer subsystem 160 (e.g., formed by the IoT devices 163). However, public safety network 130 and/or video surveillance system 140 may determine that an emergency situation is occurring at that same time. As such, subsystems 130 and 140 may determine that testing of subsystem 160 is not appropriate (or simply not available) at the time initially selected by workflow server 102. Workflow server preferably has the flexibility to consider all of these variables when selecting, prioritizing and queuing the test times for the various components (both hardware and software) found in each of these computer subsystems (130, 140 150 and 160).

A further advantage and feature of the present system is its preferred ability to label workflow tests as being done in "test mode". This is especially important for a security ecosystem since persons operating the system will receive notifications similar to "Intruder Detected, Back Door Breached—THIS IS ONLY A TEST" or "Fire Detected In School Gymnasium—THIS IS ONLY A TEST" or "Gunman Observed in Hospital Waiting Room—THIS IS ONLY A TEST", etc. By clearly labelling tests as such, false responses to these tests are not carried out. Simply put, no one is alerted to actually go looking for the intruder, fire or gunman when one does not actually exist. Moreover, labelling tests as tests allows these tests to be carried out at the optimal times. Simply put, the entire security ecosystem does not need to be brought offline for testing to be performed.

In accordance with the present system, the operators are informed of the results of the testing when the testing has been verified. Such notifications can be sent via onscreen displays, emails, texts, etc. as desired and may include messages like "New Garage Camera Installed And Operating Normally", or "New School Gymnasium Lock Installed and Not Operating-Send Maintenance Personnel To Investigate". As can be appreciated, the present system to test and verify the operation of computer subsystems 130, 140, 150 and 160 via workflow server 102 provides a novel system that improves computer functioning and operation, thereby reducing system downtime. As should be apparent from this detailed description above, the operations and functions of electronic computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, implement electronic workflows, and the like).

In the foregoing specification, specific examples have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together). Similarly the terms "at least one of" and "one or more of", without a more limiting modifier such as "only one of", and when applied herein to two or more subsequently defined options such as "at least one of A or B", or "one or more of A or B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of improving computer system operations by testing and verifying operation of changed computer subsystems, comprising:
   determining, via a workflow server, that a change has occurred at one or more computer subsystems associated with a given workflow implemented by the workflow server, wherein the given workflow comprises one or more triggers and one or more responsive actions;
   determining, via the workflow server, a given time to test the given workflow on the one or more computer subsystems based on one or more of: historical computer subsystem data, and a current computer subsystem status;
   providing, via the workflow server, the one or more computer subsystems with a request to test the given workflow at the given time;
   receiving, via the workflow server, respective acknowledgements from the one or more computer subsystems of the request to test the given workflow, the respective acknowledgements either accepting or rejecting the given time to test the given workflow;
   when the given time is accepted, sending, via the workflow server, to the one or more computer subsystems, one or more respective control signals to control the one or more computer subsystems to automatically perform a test of the given workflow at the given time, in a test mode such that one or more of the triggers are activated to perform one or more of the responsive actions as test actions; and verifying, via the workflow server, the change to the one or more computer subsystems by: evaluating results of the test actions of the given workflow, wherein the test actions are performed with a physical sensor in the computer subsystem generating sensor data of the test action and a communication device in the computer subsystem sending the sensor data to the workflow server.

2. The method of claim 1, further comprising:
synchronizing a database in the workflow server with a respective database in the one or more computer subsystems based on the evaluating of the results of the test.

3. The method of claim 1, wherein the one or more computer subsystems accept or reject the given time to test the given workflow based on one or more of: respective historical subsystem data; and a respective current subsystem status.

4. The method of claim 1, wherein the one or more computer subsystems accept or reject the given time to test the given workflow based on meeting respective threshold conditions for the triggers of the test actions corresponding to one or more of: respective historical subsystem data; and a respective current subsystem status.

5. The method of claim 1, wherein the one or more computer subsystems reject the given time to test the given workflow when the given workflow is running or about to run at the given time to test the given workflow.

6. The method of claim 1, wherein the one or more computer subsystems reject the given time to test the given workflow when respective computer subsystem resources are not available at the given time to test the given workflow.

7. The method of claim 1, further comprising:
receiving, from the one or more computer subsystems, an alternate given time to test the given workflow when the one or more computer subsystems reject the given time to test the given workflow.

8. The method of claim 7, wherein determination of the alternate given time to test the given workflow is based on one or more of: respective historical subsystem data; and a respective current subsystem status.

9. The method of claim 7, wherein determination of the alternate given time to test the given workflow is based on meeting threshold conditions corresponding to one or more of: respective historical subsystem data; and a respective current subsystem status.

10. The method of claim 1, wherein determining that the change has occurred at the one or more computer subsystems associated with the given workflow comprises:
receiving an indication of the change from the one or more computer subsystems, the change comprising one or more of: a software upgrade; a replacement of one or more of components of a computer subsystem; or a reconfiguration of computer subsystem components.

11. A device comprising:
a controller; and
a computer-readable storage medium having stored thereon program instructions that, when executed by the controller, causes the controller to perform a set of operations comprising:
determining that a change has occurred at one or more computer subsystems associated with a given workflow implemented by a workflow server, wherein the given workflow comprises one or more triggers and one or more responsive actions;
determining a given time to test the given workflow on the one or more computer subsystems based on one or more of: historical computer subsystem data, and a current computer subsystem status;
providing the one or more computer subsystems with a request to test the given workflow at the given time;
receiving respective acknowledgements from the one or more computer subsystems of the request to test the given workflow, the respective acknowledgements either accepting or rejecting the given time to test the given workflow;
when the given time is accepted, sending to the one or more computer subsystems, one or more respective control signals to control the one or more computer subsystems to automatically perform a test of the given workflow at the given time, in a test mode such that one or more of the triggers are activated to perform one or more of the responsive actions as test actions; and
verifying the change to the one or more computer subsystems by: evaluating results of the test actions of the given workflow, wherein the test actions are performed with a physical sensor in the computer subsystem generating sensor data of the test action and a communication device in the computer subsystem sending the sensor data to the workflow server.

12. The device of claim 11, wherein the set of operations further comprises:
synchronizing a database in the workflow server with a respective database in the one or more computer subsystems based on the evaluating of the results of the test.

13. The device of claim 11, wherein the one or more computer subsystems are configured to accept or reject the given time to test the given workflow based on one or more of: respective historical subsystem data; and a respective current subsystem status.

14. The device of claim 11, wherein the one or more computer subsystems are configured to accept or reject the given time to test the given workflow based on meeting respective threshold conditions for the triggers of the test actions corresponding to one or more of: respective historical subsystem data; and a respective current subsystem status.

15. The device of claim 11, wherein the one or more computer subsystems are configured to reject the given time to test the given workflow when the given workflow is running or about to run at the given time to test the given workflow.

16. The device of claim 11, wherein the one or more computer subsystems are configured to reject the given time to test the given workflow when respective computer subsystem resources are not available at the given time to test the given workflow.

17. The device of claim 11, wherein the set of operations further comprises:
receiving, from the one or more computer subsystems, an alternate given time to test the given workflow when the one or more computer subsystems reject the given time to test the given workflow.

18. The device of claim 17, wherein determination of the alternate given time to test the given workflow is based on one or more of: respective historical subsystem data; and a respective current subsystem status.

19. The device of claim 17, wherein determination of the alternate given time to test the given workflow is based on meeting threshold conditions corresponding to one or more of: respective historical subsystem data; and a respective current subsystem status.

20. The device of claim 11, wherein the set of operations further comprises:
   receiving an indication of the change from the one or more computer subsystems, the change comprising one or more of: a software upgrade; a replacement of one or more of components of a computer subsystem; or a reconfiguration of computer subsystem components.

* * * * *